(12) United States Patent
Keusenkothen et al.

(10) Patent No.: US 9,187,699 B2
(45) Date of Patent: Nov. 17, 2015

(54) HYDROCARBON PYROLYSIS PROCESS

(71) Applicant: ExxonMobil Chemical Patents Inc., Baytown, TX (US)

(72) Inventors: Paul F. Keusenkothen, Houston, TX (US); Richard C. Stell, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 569 days.

(21) Appl. No.: 13/623,541

(22) Filed: Sep. 20, 2012

(65) Prior Publication Data

US 2013/0116494 A1 May 9, 2013

Related U.S. Application Data

(60) Provisional application No. 61/557,050, filed on Nov. 8, 2011.

(51) Int. Cl.
*C07C 4/04* (2006.01)
*C10G 1/06* (2006.01)
*B01J 19/24* (2006.01)

(52) U.S. Cl.
CPC .............. *C10G 1/065* (2013.01); *B01J 19/2485* (2013.01); *B01J 2219/2412* (2013.01); *B01J 2219/2419* (2013.01); *B01J 2219/2445* (2013.01); *B01J 2219/2446* (2013.01)

(58) Field of Classification Search
USPC .................................................. 585/539, 538
See application file for complete search history.

(56) References Cited

U.S. PATENT DOCUMENTS

| | | | |
|---|---|---|---|
| 1,860,624 A | 5/1932 | Sauerwein | |
| 2,319,679 A | 5/1943 | Hasche et al. | |
| 2,678,339 A | 5/1954 | Harris | |
| 2,692,819 A | 10/1954 | Hasche et al. | |
| 3,024,094 A | 3/1962 | Coberly | |
| 3,093,697 A | 6/1963 | Kasbohm et al. | |
| 3,242,223 A | 3/1966 | Nonnenmacher et al. | |
| 3,419,632 A | 12/1968 | Sogawa et al. | |
| 7,119,240 B2 | 10/2006 | Hall et al. | |
| 7,138,047 B2 | 11/2006 | Stell et al. | |
| 7,208,647 B2 | 4/2007 | Peterson et al. | |
| 7,648,626 B2 | 1/2010 | Stell et al. | |
| 7,914,667 B2 | 3/2011 | Keusenkothen et al. | |
| 2007/0191664 A1 | 8/2007 | Hershkowitz et al. | |

*Primary Examiner* — Thuan D Dang

(57) ABSTRACT

Disclosed is a pyrolysis process that is capable of being with reduced coke and/or tar formation. The process can pyrolyze hydrocarbon feed that contains low- to mid-range levels of non-volatiles. Pyrolysis is carried out with a predetermined amount of the feed being in the liquid phase so as to minimize coke and/or tar formation in the pyrolysis reactor. The pyrolysis feed may also include a diluent, such as molecular hydrogen, that further acts to minimize coke and/or tar formation in the pyrolysis reactor. The amount of diluent in the pyrolysis feed can be adjusted to adjust or control dry point of the hydrocarbon in the pyrolysis feed.

13 Claims, 3 Drawing Sheets

HYDROCARBON PYROLYSIS PROCESS

PRIORITY

This application claims priority to Provisional Application No. 61/557,050, filed on Nov. 8, 2011, the disclosures of which are incorporated herein by reference in their entireties.

FIELD OF THE INVENTION

This invention relates to a process for pyrolyzing a feed comprising hydrocarbon to produce a pyrolyzed hydrocarbon product that comprises unsaturates. In particular, the invention relates to a process for pyrolyzing a pyrolysis feed in a regenerative reactor under thermal pyrolysis conditions.

BACKGROUND OF THE INVENTION

To convert hydrocarbons into petrochemical or basic chemicals, chemical conversion processes are typically utilized. These processes involve using thermal or chemical reactors to produce products, such as acetylene, ethylene and/or propylene in different proportions. As an example, pyrolysis is a conversion process in which at least a portion of the hydrocarbons in a stream is converted (e.g., cracked) at an elevated temperature into unsaturated hydrocarbon molecules, such as $C_2$ unsaturates. Pyrolysis typically occurs at operating temperatures above 430° C.

Different types of processes may be utilized to crack hydrocarbons. These processes can be divided into four different types: partial combustion processes, indirect combustion processes, arc processes, and thermal pyrolysis processes. These pyrolysis process types differ in the means utilized for generating and transferring the heat for the pyrolysis and/or in the severity of the operating conditions (e.g., low-severity and high-severity).

While various different types of processes may be utilized, certain processes may be preferred based on the feed. For instance, because certain hydrocarbon containing feeds are more expensive than others, it is desirable to use lower cost, heavier hydrocarbon containing feeds in pyrolysis processes to produce unsaturate products having two carbon atoms ($C_2$). The heavier hydrocarbon feeds tend to contain higher amounts of non-volatiles (e.g., combustible non-volatiles and non-combustible non-volatile) and tend to form higher amounts of coke, ash and tar, which make it more difficult to pyrolyze the heavier hydrocarbons containing feeds due to the formation of the coke, ash and tar deposits in the pyrolysis reactors.

The partial combustion processes, indirect combustion processes and arc processes are able to handle wider varieties of hydrocarbon feeds, such as heavier hydrocarbon feeds that contain non-volatiles, because these processes do not rely upon heat transfer through a solid material to transfer sufficient heat to crack the hydrocarbon. Rather, these types of processes involve the mixing of combustion products and pyrolyzed hydrocarbon products together (e.g., utilize pyrolysis and combustion chemistry) or utilizing plasma arcs or electric arcs to supply sufficient heat to crack at least a portion of the hydrocarbons in the feed to unsaturated compounds. Examples of these processes include U.S. Pat. Nos. 1,860,624; 3,242,223; 3,419,632; 7,119,240; and 7,208,647. Accordingly, these processes typically involve equipment that provide larger flow passages, which assist in managing the non-volatiles within the streams in the reactor. Limitations of these types of processes, however, include one or more of higher operating expenses, poor energy efficiency and additional separation equipment required to remove undesired byproducts (e.g., combustion products) from the pyrolyzed hydrocarbons.

Thermal pyrolysis processes provide enhancements to other pyrolysis processes by maintaining the combustion products and pyrolyzed hydrocarbon products separate through the process. Examples of thermal pyrolysis processes include U.S. Pat. Nos. 2,319,679; 2,678,339; 2,692,819; 3,024,094; 3,093,697; 7,138,047; and 7,119,240 and U.S. Patent App. Pub. No. 2007/0191664. As these thermal pyrolysis processes rely upon the transfer of heat via a heated solid material to crack the hydrocarbons within the feed (e.g., via pyrolysis chemistry alone or primarily pyrolysis chemistry), the exchange of heat via the surface area of the solid material limits the size of the flow passages for the streams. That is, thermal pyrolysis reactors are well suited for volatized or volatizable feeds that are substantially free of non-volatile compounds because non-volatiles may cause fouling. As an example, upstream of the pyrolysis, the non-volatiles (e.g., ash and asphaltenese) in the feed may lay down along the flow path at the dry point, while during or after pyrolysis, the non-volatiles may form carbon residue or coke or lay down within the flow passages along the flow path. Further, any additional ash may also lay down along the flow path as the hydrocarbons are pyrolyzed. Because of the limited flow area in the flow passages for this process, any non-volatiles within the feed may result in fouling problems and inhibit operation of the system.

To handle the feeds that contain non-volatiles in thermal pyrolysis processes, various different processes have been utilized. For instance, steam cracking processes utilize separation techniques to remove the non-volatiles upstream of the radiant section of the steam cracking furnace because the steam cracking process does not effectively handle non-volatiles. As an example, U.S. Pat. No. 7,138,047 describes a process for cracking heavy hydrocarbon feed, which mixes heavy hydrocarbon feed with a fluid, such as a lighter hydrocarbon or water, to form a mixture stream. The mixture stream is flashed to form a vapor fraction and a liquid fraction, with the vapor fraction being subsequently cracked to provide olefins.

In addition to the separation of non-volatiles, other thermal pyrolysis processes utilize steam to manage the coke formation. As an example, U.S. Pat. No. 7,648,626 describes a process to reduce fouling associated with a steam cracking process using a specified amount of steam. The process involves establishing a ratio of total dilution $H_2O$ to feed, injecting a first portion of the total dilution $H_2O$ into the convection section of the cracking furnace, and then injecting a second portion of the dilution $H_2O$ into the convection section of the furnace. The amount of dilution $H_2O$ in the form of a ratio of liquid $H_2O$ to steam is adjusted to maintain a desired temperature profile across the convection section of the furnace to lessen problems due to fouling in the furnace.

In a thermal pyrolysis process, which utilizes a regenerative reactor, the process may also include the removal of non-volatiles upstream of the regenerative reactor. As an example, U.S. Pat. No. 7,914,667 describes a thermal pyrolysis process that reduces fouling problems in a regenerative reactor. The process describes heating a non-volatile-containing feed upstream of the regenerative reactor to a temperature sufficient to form a vapor phase that is essentially free of non-volatiles and a liquid phase containing the non-volatiles; separating the vapor phase from the liquid phase; and feeding the separated vapor phase to the reactor for conversion. The disadvantage of this process is that (i) it removes 5 to 10 weight percent (wt %) of the feed as a bottoms stream to facilitate separation and (ii) the resulting viscous bottoms stream requires fluxant to be disposed as downgraded fuel oil, coker feed or other low value stream. Accordingly, this process may unnecessarily waste feed depending on the amount of non-volatiles in the feed (e.g., less than or equal to 5 wt %).

It is therefore desirable to provide enhanced processes capable of producing higher levels of unsaturated hydrocarbon compounds using heavier hydrocarbon containing feeds, which may include a liquid portion and/or non-volatiles, without having to produce a lower value bottoms stream. Also, as thermal pyrolysis regenerative processes can be operated at higher temperatures relative to conventional steam cracking processes to produce higher levels of unsaturated compounds, it is also desirable to utilize these processes to further enhance feeds that may be utilized in these systems. Further, a regenerative process may also be utilized to enhance the management of the coke and tar formed by the pyrolysis of hydrocarbons in the feed.

SUMMARY OF THE INVENTION

The present techniques involve a thermal pyrolysis process that utilizes a regenerative reactor to produce a pyrolyzed hydrocarbon product. The thermal pyrolysis process is performed in such an enhanced manner, which may even utilize a wider variety of feeds than readily handled in conventional regenerative processing schemes. The process further provides for enhanced management of the coke and tar formation.

According to one embodiment in accordance with the present techniques, there is provided a method for pyrolyzing a pyrolysis feed in a thermal pyrolysis regenerative reactor to produce a pyrolyzed hydrocarbon product. The method comprises: providing a pyrolysis feed having (i) a liquid portion and (ii) a vapor portion, the pyrolysis feed comprising a hydrocarbon component containing greater than 0.010 wt % of a non-volatile component based on total weight of the pyrolysis feed, and wherein the liquid portion is sufficient to maintain the non-volatile component in the liquid portion; passing the pyrolysis feed to a first end of a regenerative reactor; vaporizing at least a portion of the liquid portion of the pyrolysis feed at the first end of the regenerative reactor; pyrolyzing at least a portion of the hydrocarbon component to produce the pyrolyzed hydrocarbon product that comprises acetylene; conducting away the pyrolyzed hydrocarbon product from a second end of the regenerative reactor; and removing from the regenerative reactor at least a portion of the non-volatile component from the first end of the regenerative reactor.

In one or more embodiments, the non-volatile component comprises a combustible non-volatile component and a non-combustible non-volatile component. The ratio of combustible non-volatile component to non-combustible non-volatile component may be in the range of 1000:1 to 10:1 or in the range of 500:1 to 20:1, by weight. Further, the hydrocarbon component may contain from 0.010 wt % to 5 wt %, 0.050 wt % to 5 wt %, 0.050 wt % to 4 wt, or 0.10 wt % to 3 wt % of a non-volatile component, based on total weight of the pyrolysis feed. In other embodiments, the hydrocarbon component may contain from 1 wt % to 25 wt % or from 2 wt % to 16 wt % of a non-volatile component, based on total weight of the pyrolysis feed. To maintain the non-volatile components in the liquid portion, the hydrocarbon component of the pyrolysis feed in the liquid portion may be in the range of 5 wt % to 40 wt % or in the range of 10 wt % to 30 wt % based on total weight of the pyrolysis feed.

In one or more embodiment, the method may include interrupting production of the pyrolyzed hydrocarbon product; introducing a combustion reactant to the second end of the regenerative reactor; reacting the combustion reactant in the regenerative reactor to form combustion products; flowing the combustion products toward the first end of the regenerative reactor; and conducting away at least a portion of the non-volatile components deposited in the regenerative reactor with the combustion products at the first end of the regenerative reactor.

Further, to manage the liquid portion, one or more embodiment may include combining molecular hydrogen with the pyrolysis feed upstream of the regenerative reactor to manage the liquid portion of the pyrolysis feed, combining molecular hydrogen with the pyrolysis feed in a first end of a regenerative reactor to vaporize at least a portion of the liquid portion of the pyrolysis feed at the first end of the regenerative reactor. The pyrolysis feed may be maintained at operating conditions below the dry point upstream of the regenerative reactor and/or may be exposed to operating conditions that are above the dry point within the regenerative reactor. The ratio of molecular hydrogen to carbon ($H_2/C$) is from 0.1 to 5.0, while pyrolyzing may include exposing the vaporized hydrocarbon components to a peak pyrolysis gas temperature $\geq 1500°$ C. to produce the pyrolyzed hydrocarbon product.

In another embodiment, a regenerative reactor system is described that includes a reverse flow regenerative reactor, pyrolysis inlet conduit, and a liquid distribution device in fluid communication with each other. The reverse flow regenerative reactor comprises: a housing enclosing an interior region; one or more process flow components configured to manage the flow of a pyrolysis stream through the interior region, wherein the one or more process flow components comprise one or more reactor beds. The pyrolysis inlet conduit is in fluid communication with the reverse flow regenerative reactor, has an internal surface and is configured to manage the flow of the pyrolysis stream to the reverse flow regenerative reactor. The liquid distribution device is disposed along the flow path of the pyrolysis stream, in fluid communication with the pyrolysis inlet conduit and is configured to disperse a liquid portion of the pyrolysis stream along the internal surface of the pyrolysis inlet conduit.

In certain embodiments, the regenerative reactor system, which may be deferred combustion reactor, may include additional equipment. For instance, the one or more process flow components may include two reactor beds and one or more mixing components disposed between the reactor beds. The reverse flow regenerative reactor may include one or more structural members disposed within the internal region and near the pyrolysis inlet conduit to lessen fouling near the pyrolysis inlet conduit within the internal region. Also, the system may include a non-combustible non-volatile removal unit upstream of the pyrolysis inlet conduit and configured to remove at least a portion of non-combustible non-volatile components from the pyrolysis stream. Further still, a heat exchanger may be disposed between the non-combustible non-volatile removal unit and the pyrolysis inlet conduit and configured to heat the pyrolysis stream via indirect heat exchange. The system may include one or more conduits configured to pass combustion products or reactor products through the heat exchanger to heat the pyrolysis stream.

In other embodiments, the system may include equipment associated with management of the dry point. For example, the system may include a reactor hydrogen inlet conduit configured to pass molecular hydrogen to the interior region near the pyrolysis inlet conduit and/or a conduit hydrogen inlet conduit configured to combine molecular hydrogen with the pyrolysis stream upstream of the reverse flow regenerative reactor. Further still, the system may include a temperature measurement device, a diluent control unit and a process control unit. The temperature measurement device may be disposed upstream of the reverse flow regenerative reactor and may be configured to measure the temperature of the pyrolysis stream upstream of the reverse flow regenerative reactor, while the diluent control unit may be disposed adjacent to the reverse flow regenerative reactor and may be configured to adjust the flow rate of hydrogen provided to the pyrolysis stream. The process control unit may have a set of instructions stored in memory, which are executed by a process, may be in communication with the diluent control unit and the temperature measurement device and may be configured to: (i) obtain operational parameters or data from a temperature measurement device; (ii) calculate the amount of hydrogen diluent; and (iii) provide an indication to the diluent control unit to adjust the flow rate of the hydrogen.

BRIEF DESCRIPTION OF THE DRAWINGS

Examples of various preferred embodiments of the present techniques are shown in the attached Figures, wherein.

Figure 1:
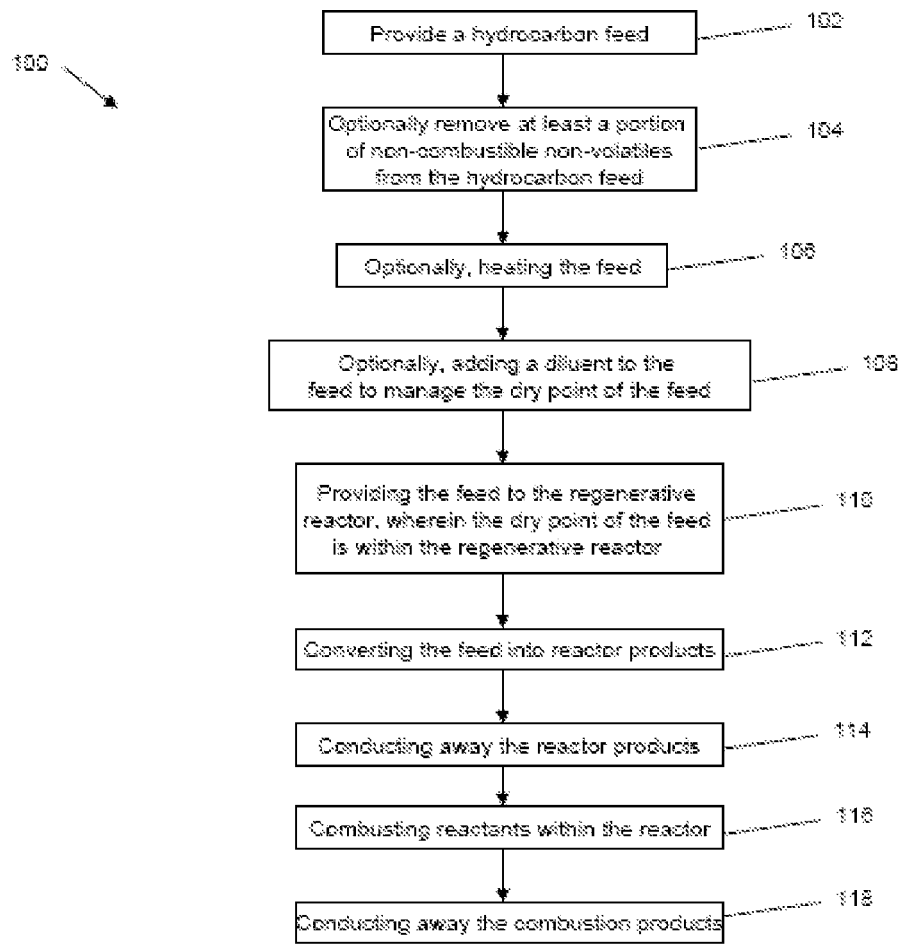
FIG. 1 is a simplified process flow diagram illustrating an embodiment of the present techniques.

The invention will be described in connection with its preferred embodiments of the present techniques. However, to the extent that the following detailed description is specific to a particular embodiment or a particular use, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE INVENTION

I. Introduction

The present techniques involve an enhanced thermal pyrolysis process. This process may be utilized in a regenerative reactor under thermal pyrolysis conditions (e.g., thermal pyrolysis regenerative process or reactor) to manage non-volatiles in the process and/or the dry point of the hydrocarbons in the pyrolysis feed being provided to the regenerative reactor. Specifically, the process may involve thermal pyrolysis of pyrolysis feeds containing hydrocarbons, which may include non-volatiles or higher boiling point materials. This process may manage the dry point of the feed upstream and into the reactor and any non-volatiles that lay down within the reactor. Further, the process may enhance the management of coke and/or tar internal to the regenerative reactor.

In one embodiment, the process may manage the deposition of non-volatiles in the feed within the regenerative reactor. The process may include thermal processing of pyrolysis feed, which contains non-volatiles as further described below. In particular, the pyrolysis feed to the regenerative reactor may include hydrocarbons that are in the liquid phase prior to entering the reactor (e.g., a liquid fraction or portion of the pyrolysis feed, which may be referred to as the maltene fraction). In this manner, the non-volatiles within the pyrolysis feed may be inhibited from fouling the equipment upstream of the reactor (e.g., conduits, manifolds, valves, etc.) along the flow path. The liquid portion may assist in passing the non-volatiles to the internal region within the regenerative reactor. That is, the liquid portion is sufficient to maintain the non-volatile component in the liquid portion. Based on the operation of the regenerative reactor, the non-volatiles disposed within the reactor may be subsequently removed in a subsequent step (e.g., a heating step or a sweep step). In this manner, the process may manage the non-volatiles within the internals of the regenerative reactor during normal hydrocarbon processing mode.

For a regenerative reactor, certain non-volatiles may be more problematic than others. For instance, many non-volatiles, such as combustible non-volatiles, may be burned off of the internal reactor components via a part of a cyclical process, such as a heating step. In particular, if the regenerative reactor is operated at high-severity (e.g., higher temperatures than typically used in steam cracking processes), then these components may be efficiently removed in the heating step. However, other non-volatiles (e.g., non-combustible non-volatiles) may deposit as ash (e.g., metals and/or minerals) within the regenerative reactor and may not be easily removed by the subsequent step. These non-combustible non-volatiles may be managed in this process via other suitable means, such as shorter cycles as compared to other processes, higher flow velocity in subsequent reverse flow steps and/or the use of flushing fluids.

A diluent may also be utilized to further enhance the management of the dry point of the feed along the flow path through equipment and even into the reactor. Dry point of the pyrolysis stream is considered to be a condition at which the volatile portion of the hydrocarbon liquid portion has become fully vaporized. This results in the pyrolysis stream becoming a vapor phase and non-volatiles (e.g., solids). In other words, the dry point describes when the pyrolysis feed no longer contains a liquid fraction. At the dry point and downstream of it, only vapor components and non-volatiles remain in the stream (e.g., operating conditions above the dry point). Upstream of the dry point, the stream comprises a liquid fraction and/or a vapor fraction (e.g., operating conditions below the dry point). The temperature at which hydrocarbons in the pyrolysis stream may vaporize depends on the operating conditions and the composition of the stream. As is understood by those of skill in the art, the final boiling point of a hydrocarbon is a physical property based on the vapor pressure of the liquid measured at atmospheric conditions. If boiling point is measured under vacuum, the boiling point is lower due the lower vapor pressure. The vapor pressure of a liquid can also be reduced by lowering the partial pressure of the liquid by adding a diluent, such as hydrogen gas, hydrocarbons or steam.

The diluent enables the vaporization of hydrocarbons in the pyrolysis feed at a lower temperature than without a diluent. Accordingly, the process may manage the operating conditions of the stream through the process and diluent may be added to the stream to maintain a specific liquid portion of the stream. Once passed to the reactor, the diluent and/or operating conditions may be adjusted to reach the dry point at one end of the reactor to manage the non-volatiles along the flow path. This diluent may be combined with the pyrolysis feed being provided to the regenerative reactor at one or more locations upstream of the regenerative reactor or within the regenerative reactor. As an example, the diluent may be combined with the pyrolysis feed within the initial region of the reactor, in a static mixer upstream of the reactor, in a non-combustible non-volatile removal unit upstream of the reactor, in a joint of two or more conduits upstream of the reactor, and/or other suitable locations. The amount of diluent can also be adjusted to manage the liquid portion along with the dry point of the stream passing through the respective equipment.

This diluent, such as molecular hydrogen, may also be utilized to lessen coke and/or tar formation in the reactor because it may react with the hydrocarbons in the feed. Hydrogen is especially beneficial in that it may chemically reduce coke formation via reduction chemistry, without producing any significant quantity of undesirable by-product. Accordingly, the diluent may also be utilized to manage the formation of tar and coke, as well as assist in managing the dry point of the feed to the regenerative reactor.

The process of the present techniques is particularly suited to thermal pyrolysis performed in regenerative reactors that carry out a heating step (e.g., heating and regeneration) and a pyrolysis step (e.g., a reaction or pyrolysis) in a sequential cycle. Such reactors may include, for example, a regenerative reactor and/or a reverse-flow regenerative reactor. For instance, the heating step of the process may remove coke and/or tar and any non-volatiles deposited in the reactor. This process may be further enhanced by the use of a reverse flow regenerative reactor that operates the heating step and pyrolysis steps in reverse directions. Accordingly, the flow of the streams may further enhance the management of these non-volatiles, as compared to other processes. Different aspects of the present techniques are explained further below.

II. Pyrolysis Feed

"Pyrolysis feed" refers to the mixture or stream that is fed directly to (e.g., enters) the reactor. The pyrolysis feed can be derived from any suitable hydrocarbon feed, in which the hydrocarbon feed may be optionally treated to provide the pyrolysis feed, such that the pyrolysis feed can comprise any variety of hydrocarbon compounds. For example, a hydrocarbon feed may include substantial amounts of non-volatiles such that the hydrocarbon feed would not be desirable as pyrolysis feed, unless at least a portion of the non-volatiles are removed. In such cases, the hydrocarbon feed can be treated to reduce extremely high quantities of non-volatiles or any other type of hydrocarbon or non-hydrocarbon component as desired. Examples of such treatment include, but are not limited to, treatment by resid hydrotreaters, hydrovisbreakers, acid washes, filtration, chelation, membrane or filtration, resid hydrotreater, acid extraction, or any number of metals reduction processes.

As used herein, the "hydrocarbon feed" contains hydrocarbons (C bound to H) and may contain (i) minor components of heteroatoms (less than (<) 10 weight percent (wt %)) covalently bound to hydrocarbons and (ii) minor components of heteroatoms (<10 wt %) not bound to hydrocarbons (e.g., $H_2O$), wherein these weight percents are based on the weight of the hydrocarbon feed. Reference to "hydrocarbon compounds" or "hydrocarbons in the hydrocarbon feed" or "hydrocarbons of the pyrolysis feed" means molecules that contain at least hydrogen and carbon and, optionally containing heteroatoms such as oxygen, sulfur and nitrogen. Weight percents of hydrogen and carbon, as used to characterize the hydrocarbon content of the feed, are typically provided as a percent of the hydrocarbons in the feed. Preferably, the hydrocarbon compounds are comprised of at least 75 percent (%) of both carbon and hydrogen, based on total atom content of the hydrocarbon.

The term "hydrocarbon feed" means feeds comprising hydrocarbons that contain at least a liquid phase, which may include partially dissolved solids and/or semisolids, and may contain a vapor phase or may be blended with a vaporous hydrocarbon. Examples of hydrocarbon feeds or blend components include one or more of petroleum-derived streams; methane; methane-containing streams, such as coal bed methane, biogas, associated gas, natural gas, and mixtures or components thereof; synthetic crudes; shale oils; or hydrocarbon streams derived from plant or animal matter. Suitable hydrocarbon source materials include those described in U.S. Pat. Nos. 7,943,808 and 7,544,852, which are incorporated by reference herein in their entirety.

Particular hydrocarbons useful according to the present techniques are those that can be pyrolyzed to produce a product containing alkenyl containing compounds, alkynyl containing compounds or both. Particularly preferred are hydrocarbon compounds that can be pyrolyzed to produce product containing equal to or greater than (≥) 1 volume percent (vol. %), more preferably ≥3 vol. %, and most preferably ≥6 vol. % alkynyl containing compounds, based on total volume of pyrolyzed product produced form the pyrolysis process. The preferred alkynyl containing product comprises acetylene.

The pyrolysis feed may further include one or more diluents. A diluent may be a composition that is used to control partial pressure in the vapor phase. The diluent may include an inert compound that is substantially unreactive with the hydrocarbon in the pyrolysis reaction. Examples of useful diluents include, but are not limited to, hydrogen, nitrogen and the noble gases, such as helium, neon and argon.

In optional embodiments, such as certain high temperature conditions, the diluent does not include any significant level of atomic oxygen, such as in the form of water, because the presence of oxygen tends to produce undesirable levels of carbon oxides in the pyrolyzed hydrocarbon product at the desired pyrolysis temperatures of the process. For example, the diluent may include less than 10 wt % water, preferably less than 5 wt % water, or less than 3 wt % water, based on feed entering the reactor.

The pyrolysis feed is the hydrocarbon-containing stream provided to the pyrolysis reactor (e.g., the stream that enters the pyrolysis reactor) and may contain at least a portion of one or more hydrocarbon feeds as well as one or more diluents, such as molecular hydrogen ($H_2$). The pyrolysis feed may include hydrogen gas ($H_2$) in an amount that provides a preferred ratio of hydrogen gas ($H_2$) moles to the total moles of carbon (C) in the hydrocarbon components of the pyrolysis feed. The ratio of hydrogen to carbon ($H_2$/C) may be from 0.0 or 0.1 to 5.0, such as 0.0, 0.1, 1.0, 2.0, 3.0, 4.0, 5.0, or values in between. Combining the hydrogen content of the hydrogen gas to the hydrogen and carbon contents of the hydrocarbon components of the pyrolysis feed may result in a total atomic ratio of hydrogen (H) to carbon (C) in the pyrolysis feed that is in the range of 0.1 to 20 or in the range of 3 to 15. The weight percent of total hydrogen in the pyrolysis feed may be greater than that in the hydrocarbon feed that it is derived from. For example, the weight percent of total hydrogen in the pyrolysis feed may be from 8 wt % to 54 wt %.

The term "hydrogen content" means atomic hydrogen bound to carbon and/or heteroatoms covalently bound thereto and which excludes molecular hydrogen ($H_2$) in feed expressed as a weight percent based on the weight of the hydrocarbons in the feed. Hydrogen content as applied to pyrolysis feed is expressed as an ASTM weight percent of hydrocarbons in the respective feed. As used herein, the expression "low hydrogen content feed" or "low hydrogen content hydrocarbon feed" means a feed with a hydrogen content of less than or equal to (≤) about 14 wt %. The hydrogen content of feeds, reactants and products for present purposes can be measured using any suitable protocol (e.g., ASTM D4808-01 (2006), Standard Test Methods for Hydrogen Content of Light Distillates, Middle Distillates, Gas Oils, and Residua by Low-Resolution Nuclear Magnetic Resonance Spectroscopy or ASTM D5291-10 Standard Test Methods for Instrumental Determination of Carbon, Hydrogen, and Nitrogen in Petroleum Products and Lubricants).

The pyrolysis feed may comprise a volatile hydrocarbon component and a non-volatile component. A volatile hydrocarbon may be referred to as a hydrocarbon that can be vaporized, which, for example, may be volatilized at one atmosphere, with small amount if any residue remaining after achieving final boiling point. Volatile hydrocarbons useful according to the present techniques can include lower boiling point hydrocarbons. Boiling points as referred to herein are preferably determined according to ASTM D86-07 Standard Test Method for Distillation of Petroleum Products at Atmospheric Pressure. The volatile hydrocarbon may vary based on the diluent, pressure and temperature, which may include higher final boiling points.

At least a portion of the hydrocarbon component of the pyrolysis feed is in the liquid phase. In a preferred embodiment, the hydrocarbon component of the pyrolysis feed is in both the liquid phase and the vapor phase. That is, the pyrolysis feed has a liquid portion and a vapor portion, wherein the liquid portion is sufficient to maintain the non-volatiles component in the liquid portion. Sufficient to maintain the non-volatiles component means the liquid portion is able to suspend the non-volatile components and/or dissolve non-volatile components, which may include partial dissolving of the non-volatile components in the heavy liquid fraction. In certain embodiments, not greater than 10 wt % of the hydrocarbon component is in the liquid phase, based on total weight of the hydrocarbon component in the pyrolysis feed. Alternatively, not greater than 5 wt %, or 4 wt % or 3 wt % of the hydrocarbon component is in the liquid phase, based on total weight of the hydrocarbon component in the pyrolysis feed. As a further example, from 0.1 wt % to 10 wt %, or from 0.1 wt % to 5 wt %, or from 0.1 wt % to 4 wt %, or from 0.1 wt % to 3 wt % of the hydrocarbon component is in the liquid phase, based on total weight of the hydrocarbon component in the pyrolysis feed.

A non-volatile component may be referred to as a composition that can not be vaporized or can not be adequately vaporized without substantial deposit of solid or semisolid residue. For example, a non-volatile component may be a composition that can not be vaporized at one atmosphere. The non-volatile component, i.e., "non-volatiles," can be more particularly defined by asphaltene content. Asphaltenes are semisolids or solids, which can be determined according to ASTM D6560-00 (2005) Standard Test Method for Determination of Asphaltenes (Heptane Insolubles) in Crude Petroleum and Petroleum Products. Asphaltenes can be found in heavy hydrocarbon fractions. For example, asphaltenes can be found in 1050° F.+(566° C.+) fractions (hydrocarbons that have a boiling point of at or above 1050° F. (566° C.). The term "1050° F.+" or "566° C.+" indicates that the boiling point of the fractions are equal to and greater than 1050° F. or 566° C. As a further example, Arab Medium crude contains about 25 wt % vacuum resid (a 1050° F.+(566° C.+) fraction). Vacuum resid has an asphaltene content of about 12 wt % and a non-combustible non-volatile (e.g., ash, such as metal or minerals) content of as low as 150 parts per million weight (ppmw). In this example, the volatile component is 88 wt % of the vacuum resid.

The non-volatile component can be comprised of a mixture of combustible non-volatiles (combustible non-volatile component) and non-combustible non-volatiles (non-combustible non-volatile component). The non-combustible non-volatile content can be determined according to ASTM D482-07 Standard Test Method for Ash from Petroleum Products. The combustible non-volatile content can, therefore, be determined as the non-volatile component (asphaltene) content minus the non-combustible non-volatile content.

In one or more embodiments, the pyrolysis feed can comprise a non-volatile component in an amount of from 0.010 wt % to 5 wt %, based on total weight of the pyrolysis feed. Alternatively, the pyrolysis feed can contain from 0.050 wt % to 5 wt %, 0.05 wt % to 4 wt %, or from 0.1 wt % to 3 wt %, or from 0.1 wt % to 2 wt %, of a non-volatile component, based on total weight of the pyrolysis feed. The non-volatile component can be comprised of any ratio of combustible non-volatile to non-combustible non-volatiles. For example, the non-volatile component can be comprised of combustible non-volatile, non-combustible non-volatile or a mixture thereof. The ratio of combustible non-volatile to non-combustible non-volatiles may be in the range of 20000:1 to 2:1, or 1000:1 to 10:1, or 500:1 to 20:1, by weight.

Alternatively, in other embodiments, the feed may include substantially larger concentrations of combustible non-volatiles, while the non-combustible non-volatiles may not be present or may be extremely low. In these embodiments, the pyrolysis feed can contain less than 35 wt %, less than 25 wt %, or in the range from 1 wt % to 25 wt %, or from 2 wt % to 16 wt %, of a combustible non-volatile component, based on total weight of the pyrolysis feed. The non-combustible non-volatiles may be in the less than 0.1 wt %, less than 0.01 wt % or even less than 0.001 wt %. To support the higher amounts of combustible non-volatiles, the liquid portion weight percentage of the total feed has to be sufficient to maintain the non-volatiles in the liquid portion. Accordingly, in a preferred embodiment, the hydrocarbon component of the pyrolysis feed in the liquid phase may be in the range of 5 wt % to 40 wt %, 10 wt % to 30 wt % or even 15 wt % to 25 wt %, based on total weight of the hydrocarbon component in the pyrolysis feed.

III. Reactor

A reactor refers to equipment used for chemical conversion. As such, several items identified as reactors may be combined to become a single entity that is also identified as a reactor, in that individual and combined entities may be characterized as equipment used for chemical conversion.

A pyrolysis reactor refers to equipment for converting hydrocarbons by means of at least pyrolysis chemistry. The pyrolysis reactor may include one or more reactors and/or associated equipment and lines. That is, in certain embodiments, the pyrolysis reactor may include one or more reactor bed (e.g., one reactor bed or at least two reactor beds in fluid communication with each other and in series, one with the other or may include two reactor beds in series within a single reactor). Suitable reactors include, for example, regenerative reverse flow reactors as described in U.S. Pat. No. 7,943,808 and thermal pyrolysis reactors as described in U.S. Pat. No. 7,491,250; U.S. Patent Application Ser. No. 61/349,464; and U.S. Patent App. Pub. Nos. 2007/0144940 and 2008/0142409, all of which are incorporated by reference herein in their entirety. Reverse-flow regenerative reactor is (i) "reverse flow" in the sense that upstream region of the reactor with respect to the average flow of a pyrolysis stream is the downstream region with respect to the average flow of another stream (e.g., combustion streams) and (ii) "regenerative" in the sense that at least a portion of the heat consumed during the conversion of the pyrolysis stream is provided by exothermically reacting the other stream. Regenerative reactor being a reactor that exothermically reacts fuel and oxidant to store heat within a defined volume in a heating step and removes a portion of the heat during the conversion of a feed stream in a conversion step in sequential steps. For example, under thermal pyrolysis conditions, the regenerative reactor exothermically reacts fuel and oxidant to store heat within a defined volume (e.g., reactor bed) in a heating step and removes a portion of the heat during the conversion of a pyrolysis stream in a pyrolysis step.

Pyrolysis or pyrolysis chemistry involves the conversion of hydrocarbons to unsaturates, such as ethylene and acetylene, which is an endothermic reaction requiring addition of heat. The terms "crack" and "cracking" may be used interchangeably with the terms pyrolyze and pyrolysis. In a pyrolysis reaction, ≥50%, ≥80%, or ≥90%, of this heat is provided by heat transfer via solid surfaces, such as tubulars or bed materials. Any combustion chemistry that occurs within the pyrolysis stream of a pyrolysis reactor provides a minority of the endothermic heat of pyrolysis, such as <50%, <20%, or <10% of the endothermic heat of pyrolysis. Accordingly, thermal pyrolysis is generally defined as a thermal decomposition process in which the pyrolysis stream is heated, generally in the absence of oxygen, to decompose hydrocarbons in the pyrolysis stream into unsaturated hydrocarbon molecules (e.g., thermal pyrolysis conditions). The pyrolyzed hydrocarbon product produced from flowing the pyrolysis feed through the reactor stage includes unsaturated hydrocarbon in which a substantial amount of the unsaturated hydrocarbon preferably includes alkyne compounds.

A zone, as used herein, refers to a location within the pyrolysis reactor, which may include one or more reactors and/or associated equipment and lines. The zone may include a specific volume within a reactor, a specific volume between two reactors and/or the combination of different disjointed volumes in one or more reactors. The thermal pyrolysis reverse-flow regenerative reactors described herein may comprise a single reactor bed, two or more reactor beds or other suitable configurations.

The reaction zone is a location in the reactor where >50%, >75% and/or >90% of the conversion of hydrocarbons into $C_2$ unsaturates is performed. That is, while some thermal cracking may occur upstream of reaction zone, the reaction zone is the location or volume within the reactor where a substantial amount of the smaller molecules are produced from the initial hydrocarbons provided to the reactor. For example, the reaction zone for a steam cracking process is in the radiant tubes of the steam cracking furnace, while the reaction zone is generally a central location between the reactor beds for a reverse-flow regenerative reactor, which may include a portion of the reactor beds near the central location and any mixing components disposed between the reactor beds.

In certain pyrolysis reactors (e.g., steam cracking furnace configuration), the heating and the pyrolysis process occur simultaneously, for example with a combusting stream on one side of partition (typically a wall or tubular) and the pyrolysis stream on the other side. Such reactors operate at or near steady state. The partition between the combustion stream (e.g., reactants used during a heating step) and the pyrolysis stream has real physical dimensions and the temperature is not equal at every location. For example, on the combustion side, temperatures may be hottest near a flame region (e.g., burner), and on the pyrolysis side temperatures increase with heat addition until some maximum temperature is reached. Steady state in these systems means that, at any given location relative to the fixed partition, temperatures remain relatively steady. However, the gases that travel through the reactor are heated and cooled by the reactions and heat transfer that takes place in the reactor.

The term "peak pyrolysis gas temperature" means the maximum temperature achieved by the bulk pyrolysis stream gases (e.g., portion of the pyrolysis stream passing through the reactor) as they travel through the pyrolysis reactor (e.g., reaction zone, such as the radiant section). One skilled in the art appreciates that temperatures immediately proximate to the partition may be higher, and may, in some infinitesimal layer, actually approach the solid temperature. However, the pyrolysis temperature referred to herein should be considered a bulk gas temperature, which is a temperature that could be measured by a device (such as a thermocouple) that is not in contact with the solid material. For example, if the gas is traveling through tubulars in a thermal pyrolysis reactor, the bulk gas temperature may be taken as the average temperature over any tubular cross-section, and the peak pyrolysis gas temperature as the highest cross-sectional-average temperature of the pyrolysis stream.

Reverse-flow regenerative reactors may involve multiple steps repeated in sequence to form a cycle for the process. The process may include a heating step to heat the reaction zone and/or reactor bed and a pyrolysis step that converts the hydrocarbons into the pyrolyzed hydrocarbon product (e.g., a reactor product). The steps may involve passing the respective streams over a solid material in fixed orientation (e.g., one or more reactor beds), which utilizes valves to alternate introduction of hydrocarbon in the pyrolysis stream and/or reactants in the combustion streams into the internal portion of the reactor. As an example, this may include flowing streams in a single direction through at least a portion of the reactor for one or more steps and reversing the flow of the streams in the opposite direction for at least a portion of the reactor one or more additional steps.

In certain embodiments, the present techniques may utilize various steps during a hydrocarbon processing mode and a non-operational mode. The hydrocarbon processing mode may refer to the steps utilized to convert hydrocarbons in the feed into useful products, such as $C_2$ unsaturates. In the hydrocarbon processing mode, the process may be a cyclical process that involves repeating a heating step, pyrolysis step and any other steps, if any, in each cycle. The process may utilize a flushing step and/or the heating step to remove at least a portion of the non-volatiles from the reactor as part of the cycle. Alternatively, a non-operation mode may be utilized for reactor cleaning operations. The non-operational mode typically involves interrupting the flow of hydrocarbons to decoke the furnace, or reactor, where decoking refers to removal of at least a portion of coke deposited on various surfaces of the reactor system.

The cycle may be performed continuously, semi-continuously, or even as a batch operation. Accordingly, a cycle includes the time spent in a heating step plus time spent in a pyrolysis step plus any time needed to switch between steps or for additional steps before the repeat of the sequence. Typical cycle times may be in the range of 1 to 60 seconds, in the range of 1 to 30 seconds, in the range of 1 to 15 seconds, or even 1 to 6 seconds. The heating and pyrolysis steps may have equal durations or may be adjusted to have different durations. The cycle time may be shorter than other conventional processes to avoid a significant build up of non-combustible non-volatiles from the pyrolysis step, which may be removed in a subsequently sweeping step, purge step and/or heating step.

The solid material in the reactor may be designed to facilitate the process of heat addition and removal. Checker bricks, tiles, pebbles and monoliths may be used as the solid materials within the reactor. Such materials form a network of passages that are used by the gases in each step to transit the region containing solid material. The heat addition step (e.g., heating step) leaves a profile of temperatures in the solid material. That is, a temperature that varies along the path by which the gases transit the solid material. The shape of that profile depends on many factors, including if and where a heat release (combustion) reaction occurs, the initial temperature distribution, the duration of the heating step, the flow rate and inlet temperature of the stream, and the heat capacity and transfer properties of the gas and solid material. On average, the solid material is hottest at the end of the heating step. The pyrolysis step consumes heat and reduces average solid material temperature. The pyrolysis step changes the profile of temperatures in the solid material, in a way that depends on many factors, including where the heat consumption (pyrolysis) reaction occurs, the initial temperature distribution, the duration of the pyrolysis step, the flow rate and inlet temperature of the stream, and the heat capacity and transfer properties of the gas and solid. Fixed-solid regenerative reactors do not operate in the steady state. That is, at any given location, the temperature changes. However, these reactors may be in a periodic steady state, meaning that the same cycling of temperatures occurs over and over as the reactor sequentially repeats the heating and pyrolysis steps.

The heat storing and transferring material may be a ceramic, which may include yttria, zirconia, alumina, and/or other refractory material capable of withstanding temperatures within the pyrolysis reactor. In the present techniques, the regenerative reactor may operate at peak pyrolysis gas temperatures of at least 800° C., at least 1000° C., at least 1200° C., at least 1700° C., at least 2000° C., preferably at least 1400° C., at least 1500° C., or more preferably at least 1540° C. That is, the peak pyrolysis gas temperature ranges may include temperatures from 800° C. to 1400° C., from 1200° C. to 2200° C., from 1450° C. to 1700° C., from 1500° C. to 1675° C., or from 1540° C. to 1650° C. In some reactions, it may even be still more preferable to expose the pyrolysis stream to heat using very short residence times, such as 0.1 second, to a temperature in excess of 1600° C. When the pyrolysis feed comprises methane, pyrolysis reactions typically include peak pyrolysis gas temperatures in excess of 1400° C. for the methane to react or convert. An exemplary preferred process may pyrolyze the feed stream within the reactor, such as at peak pyrolysis gas temperatures of from 1540° C. to 2200° C., and more preferably from 1600° C. to 1800° C. Exemplary residence times preferably may be short, such as ≤0.5 second, ≤0.3 second and preferably ≤about 50 milliseconds or in the range of 0.5 seconds to 0.001 seconds.

The reactor can include, e.g., one or more conduits, channels, or passages. The term "conduit" refers to means for conducting a composition from one location to another. The term encompasses (i) elementary conducting means, such as a pipe or tube, and (ii) complex means such as tortuous pathways through conducting means, e.g., pipes, tubes, valves, and reactors, that are filled with random packing. The term "passage" means a geometrically contiguous volume element that can be utilized for conveying a fluid within a reactor, regenerator, recuperator, regenerative bed, monolith, honeycomb, etc. The term "channel" means a plurality of passages that can be utilized together for conveying a fluid within the reactor, regenerator, recuperator, regenerative bed, monolith, honeycomb, etc. For example, a honeycomb monolith can comprise a single channel, the channel having a plurality of passages or sets of passages, e.g., hundreds of thousands of passages per square meter of the honeycomb's cross-section.

In an embodiment, the reactor may include components comprised in part or substantially from yttria. In an embodiment, one or more of the reactor beds include separate conduits for separately channeling flow of feed components or regeneration fluid components (e.g., combustion stream components) through the reactor beds. Preferably, each reactor bed includes separate conduits. The separate flow channels in the reactor beds can further comprise flow barriers that effectively function as conduit walls to prevent cross flow or mixing of fluids between channels. Each reactor bed preferably includes multiple channels, which may preferably be in parallel flow arrangement.

In a particular embodiment, a channeled reactor bed may preferably be comprised of one or more honeycomb monoliths. Preferred honeycomb monoliths are structures that comprise many (e.g., a plurality, meaning more than one) gas flow passages or conduits, arranged in parallel fashion with walls serving to separate each passage or conduit. Such reactor can include a single monolith or a plurality of monoliths. Each monolith can be formed by extruding or die pressing monolith blocks with shaped (e.g., square or hexagonal) cross-section and two- or three-dimensionally stacking, such blocks above, behind, and beside each other. Monoliths are particularly effective as reactor beds because they provide high heat transfer capacity with minimum pressure drop.

Each monolith provides at least one flow channel (e.g., flow path) for respective streams used in the present techniques. Honeycomb monoliths can be further characterized as having open frontal area (or geometric void volume), such as from 20% to 80%, and having conduit density, such as from 50 to 2000 pores per square inch (pores/in$^2$), more preferably from 50 to 500 pores/in$^2$. The conduits may have a diameter of only a few millimeters, and preferably in the range of 0.5 millimeters (mm) to 10 mm.

Within the reaction zone, the components of the respective streams may intermingle from the separate channels within the reactor bed. That is, the mixing of the components may be performed in an open junction between reactor beds. In other embodiments, the reaction zone may include mixing components to enhance the blending or intermingling of the different components of the streams. Accordingly, a mixing component may be located between the reactor beds and configured to intermingle the components of the streams from at least one direction. The mixture is then passed downstream to the next or subsequent reactor component, such as another or second reactor bed. The mixing component is positioned between reactor beds so as to enhance mixing of combustion streams during the heating step. The mixing component is also positioned between reactor beds to enhance mixing and distribution of hydrocarbon feed and pyrolysis product during the pyrolysis step.

In an exemplary embodiment, the reactor system may include a reverse flow regenerative reactor, such as a deferred combustion reactor, and other equipment. The reverse flow regenerative reactor may include a housing enclosing an interior region, process flow components and a liquid distribution device. The process flow components may be disposed within the reactor and configured to manage the flow of a pyrolysis stream through the interior region. These process flow components may include one or more reactor beds, mixing components, etc. (e.g., two reactor beds and one or more mixing components disposed between the reactor beds). In other embodiments, the reverse flow regenerative reactor further includes one or more structural members disposed within the internal region and near the pyrolysis inlet conduit to lessen fouling near the pyrolysis inlet conduit within the internal region.

A pyrolysis inlet conduit having an internal surface and configured to manage the flow of the pyrolysis stream to the reverse flow regenerative reactor. Also, a liquid distribution device may be disposed along the flow path of the pyrolysis stream and configured to disperse a liquid phase of the pyrolysis stream along surfaces of the pyrolysis inlet conduit. Further, the system may include a non-combustible non-volatile removal unit upstream of the pyrolysis inlet conduit and configured to remove at least a portion of non-combustible non-volatile components from the pyrolysis stream. Also, the system may include a heat exchanger disposed between the non-combustible non-volatile removal unit and the pyrolysis inlet conduit and configured to heat the pyrolysis stream via indirect heat exchange. The system may also include one or more conduits configured to pass combustion products through the heat exchanger to heat the stream or one or more conduits configured to pass reactor products through the heat exchanger to heat the stream.

In addition, diluent may be added to the pyrolysis stream alone the flow path. For instance, a reactor hydrogen inlet conduit may be configured to pass hydrogen to the interior region near the pyrolysis inlet conduit. Also, a conduit hydrogen inlet conduit may be configured to combine hydrogen with the pyrolysis stream upstream of the reverse flow regenerative reactor.

IV. Heating Step

In the heating step, combustion feeds are supplied to or injected into a first reactor end zone (e.g., at or adjacent to a first end of a first reactor bed). That is, one or more combustion streams flow through a first reactor end zone, which may be a portion of the first reactor bed and the first interior region of the reactor upstream of the first reactor bed and downstream of the combustion injection components, or only the first interior region (along the flow of the combustion stream). The combustion streams may flow through conduits through a combustion preheat zone (e.g., a portion of the first reactor bed) to the reaction zone, where the combustion streams exothermically react to heat the reaction zone. In another embodiment, one combustion stream may flow through the reactor and the other may be supplied directly to the reaction zone. Preferably, the combustion streams may include a fuel stream and an oxidant stream that are maintained substantially separate until passing to the reaction zone and are capable of reacting together and combusting to supply or generate heat and produce combustion products.

The combustion streams may include two or more individual feeds that are to be combined to form a combustion reaction or a mixture of the two or more feeds, such as a fuel that does not contain oxidants (e.g., $O_2$) or non-combustible non-volatiles and a combustion oxidant that may include an oxygen or oxygen containing fluid. The fuel stream may be a hydrogen-containing composition of hydrogen, hydrocarbon or a mixture thereof. The hydrocarbon can be the same or different from the hydrocarbon used in the feed. Additional or further specific examples of fuel compositions that can be used include, but are not limited to, hydrogen, methane, ethane, ethylene, propane, propene, butane, butene, hexane, heptane, methanol, ethanol, propanol, butanol, dimethyl ether, diethyl ether, liquid natural gas (LNG), liquid petroleum gas (LPG), naphtha, gasoline, kerosene, light gas oil, heavy-oil decomposition components having a final ASTM D 86 boiling point of not greater than 565° C., natural gas, coal bed methane, landfill gas, blast furnace gas, coke oven gas, converter gas, by-product gas derived from a chemical plant, gas obtained by gasification of coal or heavy oil, coal carbonization gas, water gas from the gasification of coal, coal partial-combustion gas, light oil or gas obtained by thermal separation of heavy oil, heavy-oil thermal decomposition light-oil or gas, heavy-oil oxidation decomposition light-oil or gas, super-heavy oil thermal decomposition light-oil or gas, super-heavy oil oxidation decomposition light-oil or gas, fermentation gas, including mixtures of one or more of these substances.

The oxidant stream may include an oxygen composition that has sufficient oxygen content to enable the fuel to combust. Oxidant can be supplied in any form suitable for combustion, such as pure oxygen or in the form of air. The oxidant stream may include, but is not limited to, air, oxygen or mixtures thereof. Any of the fuel or oxidant may additionally include non-combustible but volatile diluents such as $N_2$, $CO_2$, $H_2O$, and/or other inert gases. In an embodiment, the combustion oxidant comprises oxygen in an amount of at least 80% of stoichiometric for complete combustion of combustion fuel composition. Preferably, the combustion oxidant comprises oxygen in a stoichiometric amount for complete combustion, and more preferably in an amount in excess of stoichiometric for complete combustion of the combustion fuel composition in the combustion streams.

The fuel and the oxidant are preferably not mixed until the reaction zone. That is, the combustion streams are flowed to the reaction zone through the combustion preheat zone in separate channels (e.g., a portion of a first reactor bed). For example, the fuel and oxidant can be separately flowed through separate channels of a honeycomb channel arrangement of a first reactor bed. The fuel and oxidant are preferably heated as they flow through the channels. Following heating, the fuel and oxidant are then preferably mixed, with combustion taking place.

At a point downstream of the combustion preheat zone (e.g., the reaction zone), the streams are mixed together to exothermically react to produce combustion products and heat. Preferably, the fuel and oxidant components are mixed together in the mixing component within the pyrolysis reactor. The combustion streams flow through the combustion preheat zone and exit into the reaction zone (e.g., a portion of the first reactor bed, a portion of second reactor bed and one or more mixing components, if any), where the fuel and oxidant components are mixed together and combusted to produce combustion products and heat. Heat is generated from the exothermic reaction of the fuel and oxidant components, which is carried along with the downstream flow of combustion products or materials.

The combustion products are then flowed downstream to a combustion heat transfer zone (e.g., a portion of the second reactor bed) with the combustion heat transfer zone absorbing heat produced from the combustion of the combustion streams. The heat is absorbed by the heat storing and transferring material, noted above, which may be include at least a portion of the second reactor bed. This absorbed heat by the material in combustion heat transfer zone is sufficient to enable pyrolysis of the hydrocarbons in the pyrolysis stream (e.g., hydrocarbons in the pyrolysis feed) that flow through the pyrolysis preheat zone (e.g., a portion of the second reactor bed) in the pyrolysis step, which is discussed further below. The combustion heat may also be sufficient to enable coke or tar components that may have accumulated in the combustion heat transfer zone during a previous pyrolysis step to be burned, thereby regenerating the combustion heat transfer zone. Then, the combustion products flow through the second reactor end zone, which may be a portion of the second reactor bed and a second interior region of the reactor downstream of the second reactor bed and upstream of the combustion removal components, or just the second interior volume.

The combustion heat and flow of combustion gases may be utilized in this configuration to manage non-volatile accumulations. For instance, the combustion heat may also be sufficient to enable coke or tar components that may have accumulated in the combustion heat transfer zone or in the second reactor end zone during a previous pyrolysis step to be burned, thereby regenerating the combustion heat transfer zone. This may involve operating the heating step to include excess oxygen in the combustion products that is utilized to react with the certain non-volatiles, such as combustible non-volatiles. Also, this process may involve operating the heating step to include excess fuel, such as hydrogen ($H_2$), in the combustion products that are utilized to react with the certain non-volatiles, such as combustible non-volatiles. In addition, non-volatiles may be removed via the flow of the combustion products. That is, at least a portion of both foulants and non-volatiles may be passed out of the reactor with the combustion gases. This may involve the use of higher pressure for the heating step and/or increased flow velocity of the reactants through the reactor.

V. Pyrolysis Step

In the pyrolysis step, pyrolysis feed comprising hydrocarbon, and optionally diluent such as molecular hydrogen ($H_2$), is supplied to or injected into another end of the reactor via pyrolysis injection components. The pyrolysis feed may be supplied to or injected into the pyrolysis reactor following the removal of the combustion products from the heating step, which may include a sweeping or purging step to remove products from the internal regions of the reactor. That is, the pyrolysis stream flows through the second reactor end zone, which may be a portion of the second reactor bed and the second interior region of the reactor upstream of the second reactor bed and downstream of the pyrolysis injection components, or only the second interior region (along the pyrolysis stream's flow). This pyrolysis or hydrocarbon stream may be provided at a different end of the reactor from the end that the combustion streams were supplied or injected. The direction of flow of the pyrolysis stream may be counter to the direction of flow of the combustion streams. Based on the example above in which the reactor includes at least two separate reactor beds in series, the pyrolysis stream is flowed into a pyrolysis preheat zone (e.g., a portion of the second reactor bed) from the second reactor end zone. For instance, the hydrocarbon stream may flow through conduits or channels in a through the second reactor bed, such as a honeycomb channel arrangement, as described above.

The non-volatiles, and specifically the non-combustible non-volatiles, in the feed are managed in this process via the heating step or other suitable steps, which include shorter cycles as compared to other processes. In the pyrolysis step, the feed is maintained under operating conditions to maintain a liquid fraction, which is no longer needed within the reactor. That is, the second reactor end zone is the location within the reactor where the operating conditions are managed to reach the dry point for the feed. In this manner, the non-volatiles may be deposited within this reactor volume and specifically the non-combustible non-volatiles. The reactor may include a non-volatile filtering device, which may be utilized to limit the flow of the non-volatiles within the passages of the reactor bed or to limit the flow of the non-volatiles within the reactor bed. The non-volatile filtering device may include a filter, screen, tortuous flow path element or portion of the reactor bed. This non-volatile filtering device may be disposed within the second reactor end zone or within a portion of the reactor bed.

As the pyrolysis stream flows through the pyrolysis preheat zone, the temperature along the path of flow increases. As the temperature increases to the appropriate level, pyrolysis of the hydrocarbon in the pyrolysis stream takes place in the reaction zone (e.g., a portion of the first reactor bed, a portion of second reactor bed and one or more mixing components, if any). Following the reaction zone, the pyrolysis products (e.g., unreacted and reacted hydrocarbons) are flowed through a pyrolysis quenching zone (e.g., a portion of the first reactor bed), which reduces the temperature of the pyrolyzed hydrocarbon products. The pyrolyzed hydrocarbon products may be flow through channels in the first reactor bed. The pyrolyzed hydrocarbon products are then removed from the pyrolysis quenching zone to the first reactor end zone, and further passed for processing in recovery units to process and separate one or more of acetylene, ethylene and hydrogen.

In this pyrolysis step, the pyrolysis reaction is carried out relatively quickly to avoid over-cracking so as to avoid excessive formation of undesirable by-products, particularly coke and tar compositions. Accordingly, pyrolysis reactors may be characterized in terms of the residence time of pyrolysis gases in the reactor. Residence time is considered to be the total time from the hydrocarbons entry into the pyrolysis reactor and the corresponding exit of the pyrolysis product from the reactor. Residence time is most generally defined as the time required for some average non-reacting molecule to pass through the pyrolysis reactor or furnace. Residence time may be further defined to be the time spent within the actively heated or cooled portions of the reactor or furnace. This includes time spent within tubulars or heat transfer solids of a furnace or regenerative reactor, respectively, but excludes residence time spent in headers or other means of conveyance to or from the actively heated or cooled regions of the furnace or reactor. An exact calculation of residence time requires measurements with tracer compounds (such as radioactive additives to the feed) or requires a specific knowledge of the temperature and composition of the pyrolysis stream at all times as it passes through the pyrolysis reactor. For the purposes of the present techniques, residence time (in either form) may be approximated using interpolation and extrapolation of discreet composition and temperature measurements, and/or using model-based estimations of temperature and composition, as is known in the art. As an example, the residence time for a reverse-flow regenerative reactor is the time from the exit of the pyrolysis injection component, time traveling through the first reactor bed and second reactor bed and the time to enter into the pyrolysis removal component. As noted above, residence times may be $\leq 0.5$ second, $\leq 0.3$ second and preferably $\leq$ about 50 milliseconds or in the range of 0.001 to 1.0 seconds or in the range of 0.5 seconds to 0.001 seconds.

Further, different types of thermal pyrolysis reactors may have different heat profiles. That is, some embodiments of pyrolysis reactors may operate in an isothermal manner with the heat profile being relatively constant. However, other pyrolysis reactors, such as a reverse flow regenerative reactor, may have a heat profile that is similar to a Gaussian curve. As an example, a regenerative reactor may be characterized by an initial and final temperature of 300° C. and a peak pyrolysis gas temperature of 1700° C. over at a residence time of 35 ms ($\leq 10$ ms at temperatures $\geq 1000°$ C.).

Pyrolysis of the hydrocarbons in the pyrolysis feed may involve different operating conditions, such as temperatures and pressures. The temperatures may involve those noted above. Similarly, the pressure within the reactor can vary from vacuum conditions to higher pressures. For example, pressure within the reactor may pressures ≥4 psig (27 kPa), ≥15 psig (103 kPa), ≥36 psig (248 kPa), ≥44 psig (303 kPa) or ≥103 psig (710 kPa), but may be ≤300 psig (2068 kPa), ≤163 psig (1124 kPa), or ≤150 psig (1034 kPa). As may be appreciated, these different pressures may be combined together to form different combinations depending on the specific configuration of equipment. In some embodiments, the process conditions may be at a vacuum pressure, such as less than 15 psia (103 kPa).

The quenching zone may include a portion of the first reactor bed, where the endothermic reactions are slowed. That is, average temperature within the quenching zone is less than the average temperature in the reaction zone, such as at least 50° C. or at least 100° C. or at least 200° C. less than the average temperature in the reaction zone. This quenching zone may include temperatures in the range of 1200° C. to 600° C., in the range of 1200° C. to 750° C., in the range of 1200° C. to 900° C., or in the range of 800° C. to 300° C. In the quenching zone, the acetylene reactions may lower the rate of further reactions to produce acetylene and reduce the further reactions that form carbon and other hydrocarbon compounds. The quenching is generally a rapid cooling that involves passing the pyrolysis products through the reactor bed. In certain embodiments, the quenching zone may be include injecting water, other hydrocarbons oil, solvent or other suitable flushing fluids into reactor.

As may be appreciated, the flow of hydrocarbons is interrupted after a desired or predetermined time and the combustion feeds are provided to again heat the reactor. By repeating the heating step and the pyrolysis step, the overall reaction process can be continuously carried out over a relatively long period of time. Further, the use of the heating step to remove non-volatiles may enhance the operation of the process as it is able to manage the accumulation between cycles. The shorter cycles help to assist in the removal of the non-volatiles, as they are not able to accumulate and form into harder substances.

VI. Pyrolyzed Hydrocarbon Product Processing

The pyrolyzed hydrocarbon product may contain the desired pyrolysis compounds, such as the desired alkenyl compounds, alkynyl compounds or both, as well as some amount of a wide variety of lighter and heavier boiling co-products, including molecular hydrogen from the co-feed or molecular hydrogen produced during pyrolysis. To recover the more desired compounds in the pyrolyzed hydrocarbon product, the pyrolyzed hydrocarbon product is removed from the reactor as an effluent, and the effluent is separated into various components, such as according to relative boiling point ranges. Any appropriate equipment can be used in this separation, such as evaporators, flash drums or any variety of distillation equipment or columns.

In one exemplary configuration, the effluent (e.g., pyrolyzed hydrocarbon product leaving the reactor) may be provided from the reactor to a heat exchanger to further cool the effluent and recover heat from the effluent. Then, the effluent may be provided to a solid removal unit to remove solids, such as coke, and/or other materials, such as tar from the reactor effluent. The remaining effluent may then be subjected to various separation processes to remove light gases, such as hydrogen and methane, and/or to remove heavy products. Then, the remaining effluent may be provided to an acetylene converter unit to convert at least a portion of the acetylene into ethylene. The resulting ethylene product may be further processed into polyethylene or propylene in additional processing units.

In addition to the typical separations, the recovery units may also be configured to recover and recycle the molecular hydrogen from the other products in the effluent. As an example, this may include additional units or may involve the existing downstream units with additional recycle streams. For instance, one or more distillation columns can be used to separate and recover the molecular hydrogen for recycle upstream of the reactor or within the end of the reactor.

VII. Exemplary Embodiments

FIG. 1 is a simplified process flow diagram illustrating an embodiment of the present techniques. In this flow diagram 100, a process for processing and converting a hydrocarbon containing stream is described for a hydrocarbon processing mode. In this block diagram 100, the process includes various stages. For instance, a feed preparation stage is described in blocks 102 to 108. A pyrolysis stage (e.g., a pyrolysis step) is described in block 110 to 114, which involves cracking the feed in a regenerative reactor under thermal pyrolysis conditions, which produces a reactor product (e.g., pyrolyzed hydrocarbon product). Then, a heating stage (e.g., a heating step) is described in blocks 116 to 118. The operation of this process is described further below.

At block 102, a hydrocarbon feed is provided. The hydrocarbon feed may include one or more of hydrocarbon or hydrocarbon derived feeds, such as vacuum gas oil, coker gas oil, methane and mixtures thereof, or other suitable hydrocarbons or hydrocarbon derived feeds, as noted above.

For the feed preparation stage, as shown in blocks 104 to 108, the hydrocarbon feed may be subjected to various feed preparation processes to form the pyrolysis feed or may be provided directly to the thermal pyrolysis regenerative reactor as the pyrolysis feed. That is, the pyrolysis feed is derived from at least a portion of the hydrocarbon feed. For example, the feed preparation process optionally includes removal of non-combustible non-volatiles prior to further heating or being provided to the reactor, as shown in block 104. The non-combustible non-volatiles may be removed, for example, via filtration or a membrane, or by other appropriate means. Beneficially, in certain embodiment, the removal of non-combustible non-volatiles from the feed may be more efficient, as the system may manage a larger amount of non-volatiles than other processes. That is, the removal of non-combustible non-volatiles may only remove a partial amount of the total non-combustible non-volatiles within the stream. Further, the feed preparation stage may include heating the remaining feed, as shown in block 106. The heating may involve passing the feed through a boiler, furnace, transfer line heat exchanger, shell in tube heat exchanger or other suitable unit.

Then, the heated feed may be combined with a diluent. The diluent may include molecular hydrogen or other appropriate compounds as noted above. In particular, the diluent may be combined with the feed to maintain 0.1 wt % to 10 wt % liquid of the hydrocarbons in the pyrolysis feed to manage the dry point of the stream, as previously discussed. Further, the pyrolysis feed may include a desired quantity of diluent (e.g., molecular hydrogen), which may be utilized to lessen coke and/or tar formation that can form during the pyrolysis of the hydrocarbons or from non-volatiles in the feed.

Further, in one or more embodiments, the feed preparation stage may include one or more of condensate removal units, water removal units, acid gas removal units (e.g., caustic treating units or amine treater units), dehydration units (e.g., glycol units), nitrogen removal units, hydrogenation, demetalation, visbreaking, coking and/or vapor/liquid separators. The impurities or contaminants, which may include one or more of carbon dioxide, carbon monoxide, sulfur species, and oxygenates, may be conducted away from the process.

After the feed preparation stage, the pyrolysis stage, which may be performed as part of the pyrolysis step, may be performed as described in blocks 110 to 114. At block 110, the pyrolysis feed may be provided to the regenerative reactor. The pyrolysis feed may contain a hydrocarbon component and from 0.001 wt % to 5 wt % of a non-volatile component, based on total weight of the pyrolysis feed, with the hydrocarbon component of the pyrolysis feed having a liquid fraction and vapor fraction.

Then, at block 112, the pyrolysis stream may be exposed to temperatures sufficient to convert at least a portion of the hydrocarbons in the stream to pyrolyzed hydrocarbon products, such as $C_2$ unsaturates and/or saturates. The pyrolysis stream absorbs heat from the reactor bed, and the hydrocarbon compounds endothermically react to produce the desired pyrolyzed hydrocarbon product (e.g., ethylene and/or acetylene).

At block 114, the pyrolyzed hydrocarbon product is conducted away from the reactor for further processing. The pyrolyzed hydrocarbon product, which includes acetylene, unconverted methyls, and hydrogen, is quenched, which may be within the reactor or after being conducted away from the reactor. The further processing may include passing at least a portion of the pyrolyzed hydrocarbon product through a heat exchanger to heat the feed, hydrogenating acetylene in the pyrolyzed hydrocarbon product to ethylene, or other suitable upgrading processes.

Then, another step of the cycle, such as the heating step, begins with introduction of the reactants (e.g., combustion feeds, such as air and/or fuel) into the reactor. These reactants pass separately through the reactor (e.g., via passages within a reactor bed) and are combined for exothermic reaction or combustion in or near the reaction zone (e.g., a central region of the reactor). The combustion products are conducted away through a reactor bed to transfer heat from the combustion in the reaction zone and are subsequently removed from the process.

Any non-volatiles that are passed to the reactor in the pyrolysis step may be removed during the subsequent steps. For instance, during the heating step, the oxygen within the stream may react with the combustible non-volatiles disposed within the reactor. While the non-combustible non-volatiles may not react with the oxygen, the flow of the combustion products may remove at least a portion of any remaining non-volatiles from the interior region of the reactor.

Also, a flushing step may also be utilized alone or in combination with the heating step to remove non-volatiles. The flushing step may be performed before and/or after the heating step in the cycle. The flushing fluid, which may include a liquid solvent, water, or heavy hydrocarbons (e.g., a liquid hydrocarbon that does not vaporize at the process conditions), may be passed to react with the non-volatiles disposed within the reactor. This step may involve dissolving, reacting, solubilizing and/or scrubbing at least a portion of the non-volatiles with the flushing fluid to reduce the non-volatiles present within the reactor. Also, the non-volatiles may be removed by the flow of the flushing fluid stream. In this manner, the non-volatiles may be removed from the reactor.

Figure 2:
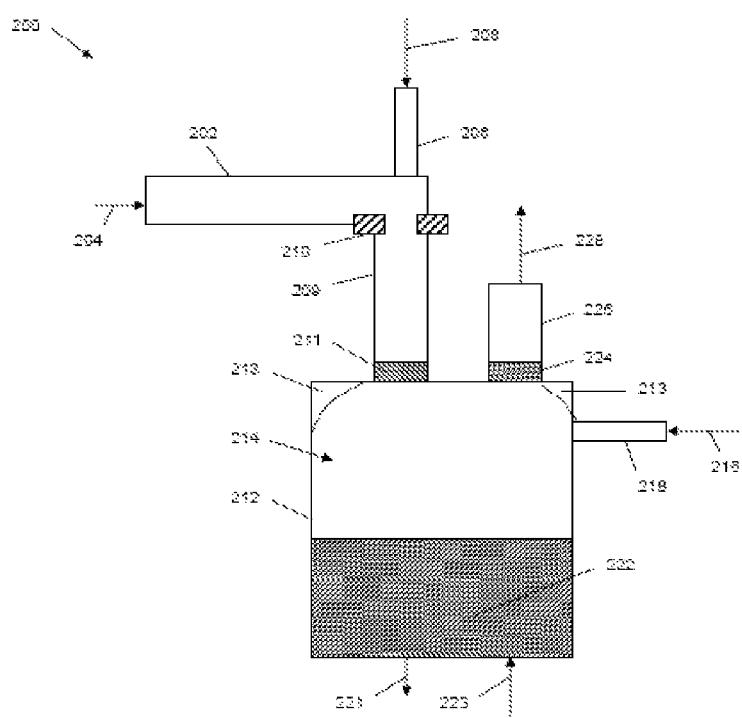
FIG. 2 is a simplified diagrammatic illustration of an exemplary system for managing the dry point of a pyrolysis feed to regenerative reactor in accordance with an embodiment of the present techniques.

As an exemplary embodiment, FIG. 2 is a simplified diagrammatic illustration of an exemplary system for managing the dry point of a feed to a regenerative reactor in accordance with an embodiment of the present techniques. In this configuration 200, the feed may be combined with diluent at various locations to manage the dry point of the stream. Also, any non-volatiles may be removed along with the combustion products as part of the combustion effluent to manage the non-volatiles within the reactor 212. This figure will now be explained in more detail.

A pyrolysis feed 204 is provided via conduits 202 and 209 and valve 211 to the interior region 214 of a portion of the reactor 212. This pyrolysis feed 204 may include hydrocarbon in a vapor phase and liquid phase as it passes through the conduits. The flow of the stream may be managed via valve 211, which is in the open position to permit the flow of the pyrolysis feed into the reactor 212 and may be closed to block the flow of the feed during the other steps, such as the heating step. The valve 211 may be a poppet valve or other suitable valve.

Along the path, a diluent 208 may be combined with the feed via conduit 206. The diluent 208, such as molecular hydrogen for example, may be provided at an angle to further enhance the flow of the pyrolysis feed 204 through the conduit 209 (e.g., a pyrolysis inlet conduit). That is, the diluent may be provided via a nozzle or other diluent distribution device that mixes the diluent with the pyrolysis feed stream in a manner that distributes the liquid phase along the surfaces of the conduit 209. In certain embodiments, the diluent may be provided to form turbulent flow, such that the diluent may be intermixed with the liquid phase. Other embodiments, the diluent may be provided to form a laminar flow through the reactor, such that the diluent may be intermixed with the liquid phase to enhance the laminar flow.

Similarly, the conduit 206 may be configured to assist in the flow and/or mixing of the diluent with the pyrolysis feed stream. In one embodiment, the conduit 206 may be axially aligned with the conduit 209 to further assist the flow of the pyrolysis feed stream into the reactor 212.

Along the flow path, a liquid distribution device 210 may also be provided to manage the flow of the liquid phase along the surfaces of the conduit 209. The liquid distribution device 210 may be utilized to substantially uniformly coat the surfaces of the conduit 209 to lessen any coke deposits that may form upstream of the reactor 212. The liquid distribution device 210 may include at least one annular distributor to generate a liquid film that fluxes non-volatiles (e.g., coke) along the flow path. The liquid distributor may define a flow path for the liquid phase to distribute the liquid phase via a tangential flow around the conduit 209, while permitting the flow of the vapor phase portion of the stream through a central flow path. Examples of the liquid distribution device (e.g., an annular flow device) may include U.S. Patent App. Pub. No. 2010-0276126. Other examples may include an atomizer, nozzle or other suitable device.

In addition, the liquid distribution device 210 may include a conduit to provide a limited quantity of liquid phase hydrocarbons via a separate line. In this manner, the stream in conduit 204 may be combined with a liquid phase hydrocarbon stream provided via a suitable distribution device, e.g. the liquid distribution device 210, to generate a hydrocarbon film that fluxes away non-volatiles along the flow path. Because the main resistance to heat transfer is between the bulk process stream and the film, the film can be at a significantly higher temperature than the bulk stream. The film effectively keeps the conduit surface wetted with fluid material as the bulk stream is heated, thus preventing fouling.

Once the pyrolysis feed is provided to the reactor 212, another diluent 216 may be combined with the stream within the reactor 212 via conduit 218. This diluent, which may be the same or a different diluent from the diluent 208 provided via conduit 206, may be combined with a limited amount of steam within the internal region 214. This additional diluent 216 may be utilized to further manage the dry point of the pyrolysis stream.

The pyrolysis stream, including diluent, if present, is passed through the reactor bed 222 to convert at least a portion of the hydrocarbons into pyrolyzed hydrocarbon product. Non-volatiles in the stream, if any, are disposed within the interior region 214 or within the initial portion of the reactor bed 222. The reactor bed 222 may be a pebble bed, a honeycomb monolith or other suitable structure that provides passages for the stream. The resulting pyrolyzed hydrocarbon product is conducted away from the reactor in another portion (not shown), in the direction of arrow 221.

In a separate step (e.g., heating step), reactants are provided and passed through another portion of the reactor 212 (not shown), in the direction of arrow 223. The resulting combustion products, which may include unreacted reactants, are then passed through the reactor bed 222 to the interior region 214 and removed via conduit 226 and valve 224 as combustion effluent 228. The combustion products may be utilized to react with non-volatiles (e.g., the excess oxygen may combust with combustible non-volatiles and/or interact with the non-combustible non-volatiles) and/or remove non-volatiles via the flow of the combustion products through the reactor 212 into the conduit 226. That is, the flow velocity of the combustion products may be utilized to conduct any non-volatiles from the reactor. The flow of the stream may be managed via valve 224, which is in the open position to permit the flow of the combustion stream from the reactor 212 and may be closed to block the flow of the pyrolysis stream during the other steps, such as the pyrolysis step. The valve 211 may be a poppet valve or other suitable valve.

In addition, various adaptations may be utilized to further manage the non-volatiles within the reactor 212. For instance, structural members 213 may be disposed with the internal region 214 to lessen fouling in certain portions of the reactor (e.g., corners or other regions that have minimal flow).

Figure 3:
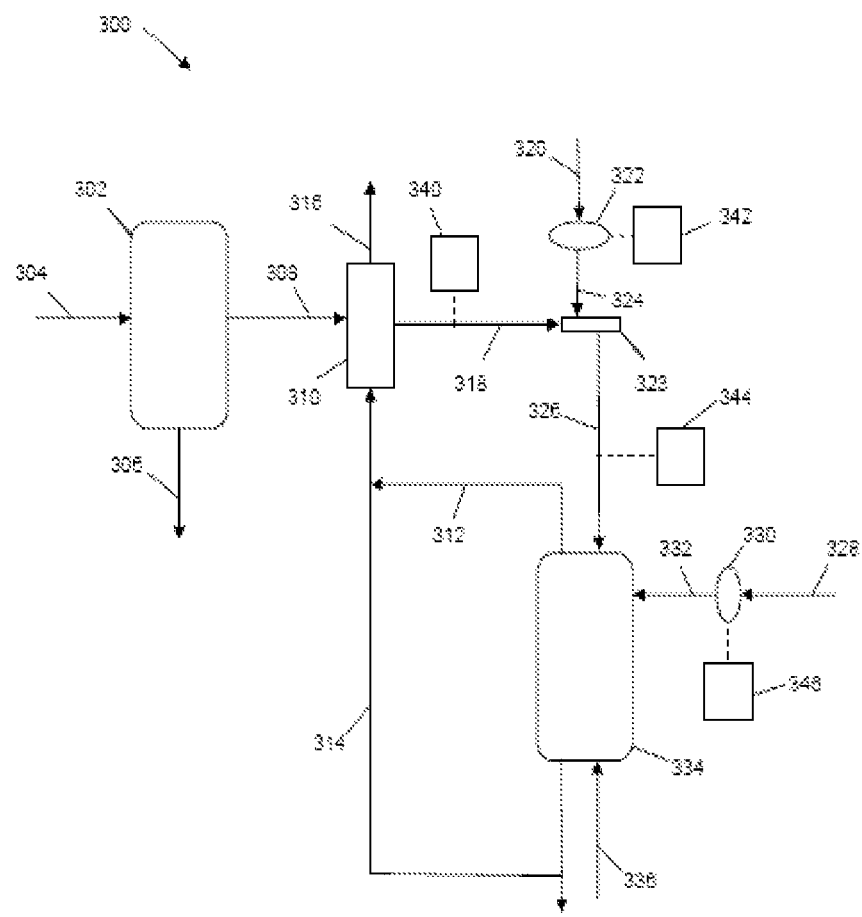
FIG. 3 is a simplified diagrammatic illustration of another exemplary system for converting a feed having non-volatiles in accordance with an embodiment of the present techniques.

As another embodiment, FIG. 3 is a simplified diagrammatic illustration of another exemplary system for converting a pyrolysis feed having hydrocarbon and non-volatiles in accordance with an embodiment of the present techniques. In this configuration 300, the feed may pass through a non-combustible non-volatile removal unit 302, and a heat exchanger 310 upstream of a reactor 334. Diluent may be provided via conduits 324 and 332 to manage the dry point of the stream as it passes through the system. Also, various measurement devices 340 and 344 may be utilized with control units 346 and 342 and a process control unit to further manage the dry point within the system. This figure will now be explained in more detail.

In this configuration 300, various stages may be utilized to enhance the operation of this system. These stages may include a feed preparation stage, a pyrolysis stage and a heating stage during the normal hydrocarbon processing mode. The feed preparation stage may include processing of the streams through system upstream of the reactor 334. The feed 304 is provided via conduit 304 to the non-combustible non-volatile removal unit 302. The non-combustible non-volatile removal unit 302 may be configured to remove at least a portion of the non-combustible non-volatiles in the feed. In this configuration, the non-combustible non-volatile removal unit 302 may separate a bottoms product containing at least a portion of the non-combustible non-volatiles from the remaining stream. The bottoms product may be removed via conduit 306, while the remaining stream may be passed to the heat exchanger 310 via conduit 308.

The heat exchanger 310 may be utilized to heat the remaining stream (e.g., the stream from conduit 308) to a specific temperature in preparation for the reactor 334. While the heat exchanger 310 may include a boiler or other heat exchanger, it may be preferred to have the heat exchanger 310 be a shell in tube heat exchanger, which utilizes indirect heat transfer and maintains the hydrocarbon containing stream separate from the utility fluid. While the heat exchanger 310 may utilize a utility fluid, such as steam, it may also utilize the combustion effluent via conduit 312 and/or the reactor effluent via conduit 314 to heat the hydrocarbon containing stream in the heat exchanger 310. By utilizing these effluent streams from the reactor 334, the process may enhance efficiency and reduce the fuel utilized to operate the reactor 334 and/or the system 300. The effluent may be further processed after passing through the heat exchanger via conduit 316, which may include a manifold with valves to direct the combustion effluent into one or more combustion effluent recovery units or to direct the reactor effluent into one or more reactor effluent recovery units.

From the heat exchanger 310, the heated stream may be passed via conduit 318 to mixing unit 323. The mixing unit 323 may be a joint in the conduits 324 and 318, one or more static mixers, one or more nozzles, a liquid distribution device or other suitable device. The mixing unit 323 may be utilized to combine the heated stream with a diluent provided via conduits 320 and 324 and valve 322. If the mixing unit is a liquid distribution device, it may also be utilized to form a substantially uniform film along the internal surface of the conduits. The pyrolysis feed or stream containing the hydrocarbons and the diluent is further provided via conduit 326 (e.g., pyrolysis inlet conduit) to the reactor 334. An additional diluent may be added to the pyrolysis stream within the reactor 334 via the conduits 328 and 322 and valve 330. Further, the diluent may be combined with the stream upstream of the non-combustible non-volatile removal unit 302, within the non-combustible non-volatile removal unit 302, between the non-combustible non-volatile removal unit 302 and the heat exchanger 310 or within the heat exchanger 310.

The pyrolysis stage (e.g., a pyrolysis step) may include conversion of a portion of the hydrocarbons within the stream in the reactor 334. The reactor 334 may be a regenerative reactor, such as a reverse flow regenerative reactor, including but are not limited to, any one or more reactors described in U.S. Patent App. Pub. No. 2007/0191664; as well as one or more pyrolysis reactors described in U.S. Pat. No. 7,491,250, U.S. Patent App. Pub. Nos. 2007/0144940 and 2008/0142409.

In the present techniques, the reverse-flow regenerative reactor may operate at peak pyrolysis gas temperatures of at least 800° C., at least 1000° C., at least 1200° C., at least 1700° C., at least 2000° C., preferably at least 1400° C., at least 1500° C., or more preferably at least 1540° C. That is, the peak pyrolysis gas temperature ranges may include temperatures from 800° C. to 1200° C., from 1200° C. to 2200° C., from 1450° C. to 1700° C., from 1500° C. to 1675° C., or from 1540° C. to 1650° C.

In some reactions, it may be preferable to expose the pyrolysis stream to heat using very short residence times, such as ≤0.1 second, to a temperature in excess of 1600° C. When the pyrolysis feed comprises methane, pyrolysis reactions typically include peak pyrolysis gas temperatures in excess of 1400° C. for the methane to react or convert.

An exemplary preferred process may pyrolyze the pyrolysis stream within the reactor, such as at peak pyrolysis gas temperatures of from 1540° C. to 2200° C., and more preferably from 1600° C. to 1800° C.

The process may involve operating the reactor at operating conditions having pressures ≥4 pounds per square inch gauge (psig) (27 kilo Pascal (kPa)), ≥15 psig (103 kPa), ≥36 psig (248 kilo Pascal (kPa)), ≥44 psig (303 kPa) or ≥103 psig (710 kPa), but may be ≤300 psig (2068 kPa), ≤163 psig (1124 kPa), or ≤150 psig (1034 kPa).

Exemplary residence times preferably may be short, such as ≤0.5 second, ≤0.3 second and preferably ≤about 50 milliseconds or in the range of 0.5 seconds to 0.001 seconds.

In an embodiment, the reactor may include components comprised of yttria. In an embodiment, one or more of the reactor beds include separate conduits for separately channeling flow of feed components or regeneration fluid components (e.g., combustion stream components) through the reactor beds. Preferably, each reactor bed includes separate conduits. The separate flow channels in the reactor beds can further comprise flow barriers that effectively function as conduit walls to prevent cross flow or mixing of fluids between channels. Each reactor bed preferably includes multiple channels, which may preferably be in parallel flow arrangement.

The reactor effluent (e.g., at least a portion of the pyrolyzed hydrocarbon product) may be further processed. The further processing may include upgrading the product, such as hydrogenation, purification of the feed and/or polymerization of the product.

The heating stage (e.g., heating step) may involve exothermically reacting the reactants (e.g., combustion feeds or streams) within the reactor 334. The reactants are provided via conduits 336, which is shown as a single conduit for simplicity, but includes two or more conduits (e.g., fuel in one conduit and air in another conduit). The combustion effluent (e.g., at least a portion of the combustion product) may be utilized to remove the non-volatile components, as noted above, and passed for further processing.

As an example, an Arab Medium vacuum gas oil (316° C. to 566° C. cut) contains 0.1 wt % asphaltenes or non-volatiles. The ash content or non-combustible non-volatiles of the hydrocarbon feed is 0.01 wt %, primarily nickel and vanadium. The components of the vacuum gas oil are shown below in Table 1:

TABLE 1

| Physical Properties | Arab Medium Blend Gas Oil 600° F. to 1050° F. (316° C. to 566° C.) |
|---|---|
| API Gravity, | 22.19 |
| Aromatics (w), wt % | 45.28 |
| Hydrogen, wt % | 12.26 |
| Specific Gravity (60/60 F.), | 0.9207 |
| Nitrogen (wt %), wt % | 0.076 |
| CCR, wt % | 0.89 |
| 15/5 IBP (0.5 vol %), ° F., ° C. | 601.8° F., 316.6° C. |
| 15/5 5 vol %, ° F., ° C. | 618.6° F., 325.9° C. |
| 15/5 10 vol %, ° F., ° C. | 637.3° F., 336.3° C. |
| 15/5 20 vol %, ° F., ° C. | 675.5° F., 357.5° C. |
| 15/5 30 vol %, ° F., ° C. | 714.7° F., 379.3° C. |
| 15/5 40 vol %, ° F., ° C. | 755.0° F., 401.7° C. |
| 15/5 50 vol %, ° F., ° C. | 796.9° F., 424.9° C. |
| 15/5 60 vol %, F. | 840.9° F., 449.4° C. |
| 15/5 70 vol %, F. | 887.7° F., 475.4° C. |
| 15/5 80 vol %, F. | 937.8° F., 503.2° C. |
| 15/5 90 vol %, F. | 991.7° F., 533.2° C. |
| 15/5 95 vol %, F. | 1020.2° F., 549.0° C. |
| 15/5 EP (99.5 vol %), F. | 1047.0° F., 563.9° C. |

TABLE 1-continued

| Physical Properties | Arab Medium Blend Gas Oil 600° F. to 1050° F. (316° C. to 566° C.) |
|---|---|
| Asphaltenes (C7), wt % | 0.1 |
| Ash, wt % | 0.01 |

This hydrocarbon feed may be diluted with hydrogen ($H_2$), fed to a flash drum or vapor liquid separator operated at 75 pounds per square inch absolute (psia) (517 kilo Pascal absolute (kPa-a)) and 407° C. to removes the 0.1 wt % non-volatiles, but the flash drum typically removes about 10% or more of the stream as a bottoms stream depending on temperature control to avoid fouling in the drum. The resulting viscous bottom streams may have to be fluxed and downgraded to coker feed or fuel oil.

However, by utilizing the present techniques, the dry point of the feed may be managed to maintain a liquid fraction along the flow path to the reactor. As an example, Table 2 includes various operating conditions for a feed having a hydrogen ($H_2$) to hydrocarbons ratio of 0.30 wt/wt, wherein the hydrocarbons have a boiling point in the range of 316° C. to 566° C. These pressures include 172 kPa-a, 345 kPa-a, 517 kPa-a and 862 kPa-a, while the temperatures are shown with the associated weight percentage of the liquid of the total hydrocarbon content, as follows:

TABLE 2

| $H_2$/316° C. to 566° C. = 0.30 wt/wt | | |
|---|---|---|
| Temp (° C.) | Press (kPa-a) | wt % liquid |
| 335 | 172 | 0.41 |
| 334 | 172 | 0.93 |
| 333 | 172 | 1.94 |
| 332 | 172 | 2.95 |
| 329 | 172 | 5.40 |
| 327 | 172 | 7.78 |
| 324 | 172 | 10.09 |
| 355 | 345 | 0.35 |
| 354 | 345 | 1.06 |
| 353 | 345 | 1.87 |
| 352 | 345 | 3.37 |
| 349 | 345 | 5.81 |
| 346 | 345 | 8.19 |
| 343 | 345 | 10.51 |
| 368 | 517 | 0.46 |
| 367 | 517 | 0.82 |
| 366 | 517 | 2.34 |
| 363 | 517 | 4.81 |
| 360 | 517 | 7.21 |
| 357 | 517 | 9.56 |
| 385 | 862 | 0.47 |
| 384 | 862 | 1.49 |
| 382 | 862 | 2.99 |
| 379 | 862 | 5.44 |
| 377 | 862 | 7.84 |
| 374 | 862 | 10.18 |

As indicated for this Table 2, the temperature may be managed within a specific range to provide the associated liquid fraction at these different pressures. For instance, at a pressure of 172 kPa-a, the temperatures in the range of about 324° C. to 335° C. provide a liquid fraction from 10.09 wt % to 0.41 wt %, while at a pressure of 345 kPa-a, the temperatures in the range of about 346° C. to 355° C. provide a liquid fraction from 8.19 wt % to 0.35 wt %. At a pressure of 517 kPa-a, the temperatures in the range of about 357° C. to about 368° C. provide a liquid fraction from about 9.56 wt % to about 0.46 wt %, while at a pressure of 862 kPa-a, the temperatures in the range of about 374° C. to about 385° C.

provide a liquid fraction from about 10.18 wt % to about 0.47 wt %. As such, for the various pressures, the stream may be maintained at different temperatures to provide a desired liquid fraction.

As an example in view of FIG. 3 above, a feed may be mixed with a diluent of hydrogen ($H_2$) and the resulting pyrolysis feed, which is at a pressure of 517 kPa-a. This stream may be heated to a temperature between 363° C. and 368° C. within the heat exchanger 310. At this temperature and pressure, >95 wt % of the hydrocarbons in the pyrolysis feed is vaporized, but a liquid fraction is preserved containing the dissolved non-volatiles. The stream passes through conduit 326 to the reactor valves and into a regenerative reactor 334 operated with an inlet temperature of greater than the pyrolysis feed temperature, but less than 510° C. to avoid potential inlet fouling. The pyrolysis reactor bed is composed of ceramic heated internally to peak temperatures greater than 1200° C. and has a Gaussian like temperature profile where the ends of the bed are at the inlet temperature, and rises to the peak temperature in the middle of the reactor 334. During the pyrolysis step, the vapor fraction of the pyrolysis stream flows through the reactor bed and converts in the reactor into pyrolyzed hydrocarbon products. The liquid fraction may continue to vaporize in the higher temperatures of the reactor end zone reaching a dry point and the resulting residue, tars or solids (about 0.1 wt %) may either accumulate on the reactor bed and/or in the reactor end zone, which may continue to crack into vaporous products (e.g., via visbreaking). During the heating step, air and fuel are introduced into the opposite reactor end zone via line 336. Excess air may oxidize or combust any non-volatiles (e.g., coke or tar) left behind in the pyrolysis step including the combustible non-volatiles carried in with the feed. The remaining 0.01 wt % non-combustible non-volatiles (e.g., ash) may be blown out of the reactor via line 312 with the combustion gases or removed with a flushing fluid (not shown).

To manage the operation of the system, in one or more of the embodiments, a control mechanism may be utilized to manage the addition of diluent to the hydrocarbon containing stream (e.g., the hydrocarbon feed, pyrolysis feed and/or pyrolysis stream). The control mechanism may include a process control unit (not shown) coupled to one or more measurement devices 340 and 344 that measure operational data (e.g., temperature, hydrogen content, composition, pressure, and the like) and one or more control units 342 and 346 for adjusting operational settings (e.g., amount diluent provided to the stream at the various locations, the amount of oxygen provided during the heating step, and/or the amount of fluid provided during a flushing step). The process control unit, measurement devices and/or control units may communicate with each other via a physical and/or wireless means.

The process control unit may include a computer system along with one or more monitors and input/output components. The computer system may include memory to store sets of instructions and operational data and a processor to execute the instructions and access the operational data. In this system, operational settings may be adjusted to manage or refine the processing of the feeds within the system and to manage the operating parameters. For instance, operational settings may be adjusted in the system to further refine the separation of the hydrocarbon feed into the bottoms product or feed, and/or adjust the amount of diluent combined with the stream as it flows through the systems. These operating parameters may include monitored values, which are stored as operational data in the memory, and utilized by the processor in executing one or more sets of instructions to manage the flow of diluents, monitor the temperatures in the system, to adjust operational settings, and other similar operations.

Along with the process control unit, the control mechanism may include different types of measurement devices, such as a temperature measurement device and a hydrogen measurement device. The temperature measurement device, which may include a thermocouple or pyrometer, may be configured to measure the temperature of the stream upstream of the diluent conduit 324 and downstream of the heat exchanger 310 and/or the temperature of the pyrolysis feed upstream of the reactor 334. The hydrogen measurement device, which may include densitometer, nuclear magnetic resonance (NMR) spectrometer or offline gravimetric analyzer (ASTM D1018, D3343, D4808, D5291, D7171) and may be configured to measure the hydrogen content of the stream upstream of the diluent conduit 324 and downstream of the heat exchanger 310 and/or the hydrogen content of the pyrolysis feed upstream of the reactor 334.

The one or more control units 342 and 346 may include different control units to adjust different operational settings. For example, a dilution control unit 342 may be utilized and configured to adjust the amount of a dilution mixed into the stream downstream of the heat exchanger 310 (e.g., by adjusting valve 322), while the dilution control unit 346 may be utilized and configured to adjust the amount of a dilution mixed into the stream within the reactor 334 (e.g., by adjusting valve 330).

The present techniques may monitor certain operating parameters and adjust operational settings to provide an enhanced process. For instance, the control mechanism may include a temperature measurement device 340 configured to measure the temperature of the stream downstream of the heat exchanger 310 and upstream of the dilution conduit 324. The control mechanism may also include a process control unit having a set of instructions stored in memory and accessed via a processor, which are configured to (i) receive data (e.g., operational parameters) from the temperature measurement device (e.g., the temperature measurement device 340); (ii) to calculate the amount of diluent; and provide an indication to a diluent control unit (e.g., the diluent control unit 342) to adjustment to the flow rate of the diluent based on the determined temperature. That is, the adjustments may be made to manage the liquid fraction and maintain the stream at operating conditions that do not reach the dry point outside of the reactor.

In another embodiment, which may be utilized with the above system, the control mechanism may also include a process control unit having a set of instructions stored in memory and accessed via a processor, which are configured to (i) receive data (e.g., operational parameters) from the temperature measurement device (e.g., the temperature measurement device 344); (ii) to calculate the amount of diluent; and provide an indication to a diluent control unit (e.g., the diluent control unit 346) to adjustment to the flow rate of the diluent based on the determined temperature. This may be performed instead of the previous or along with the previous adjustment. In this manner, the adjustments may be made to have the stream reach the dry point within the end of the reactor near the entrance of the pyrolysis stream.

In yet another embodiment, a regenerative reactor system may include a temperature measurement device disposed upstream of the reverse flow regenerative reactor and configured to measure the temperature of the pyrolysis stream; a diluent control unit disposed adjacent to the reverse flow regenerative reactor and configured to adjust the flow rate of hydrogen provided to the pyrolysis stream; and a process control unit having a set of instructions stored in memory and configured to: (i) obtain data (e.g., operational parameters) from a temperature measurement device; (ii) to calculate the amount of hydrogen diluent; and (iii) provide an indication to the diluent control unit to adjust the flow rate of the hydrogen based on the determined temperature.

One or more embodiments are described in the following paragraphs:

1. A method for pyrolyzing a pyrolysis feed in a thermal pyrolysis regenerative reactor to produce a pyrolyzed hydrocarbon product, comprising the steps of:

providing a pyrolysis feed having a liquid portion and a vapor portion and that comprises a hydrocarbon component containing greater than 0.010 wt % of a non-volatile component, based on total weight of the pyrolysis feed, and wherein the liquid portion is sufficient to maintain the non-volatile component in the liquid portion;

passing the pyrolysis feed to a first end of a regenerative reactor;

vaporizing at least a portion of the liquid portion of the pyrolysis feed at the first end of the regenerative reactor;

pyrolyzing at least a portion of the hydrocarbon component to produce the pyrolyzed hydrocarbon product that comprises acetylene;

conducting away the pyrolyzed hydrocarbon product from a second end of the regenerative reactor; and removing from the regenerative reactor at least a portion of the non-volatile component via the first end of the regenerative reactor.

2. The method of embodiment 1, wherein the non-volatile component comprises a combustible non-volatile component and a non-combustible non-volatile component.

3. The method of embodiment 2, wherein the ratio of combustible non-volatile component to non-combustible non-volatile component is in the range of 1000:1 to 10:1, by weight.

4. The method of embodiment 2, wherein the ratio of combustible non-volatile component to non-combustible non-volatile component is in the range of 500:1 to 20:1, by weight.

5. The method of any one of embodiments 1 to 4, wherein the hydrocarbon component contains from 0.050 wt % to 5 wt % of a non-volatile component, based on total weight of the pyrolysis feed.

6. The method of any one of embodiments 1 to 4, wherein the hydrocarbon component contains from 0.1 wt % to 3 wt % of a non-volatile component, based on total weight of the pyrolysis feed.

7. The method of any one of embodiments 5 and 6, wherein the liquid portion is in the range of 0.1 wt % to 10 wt % of the total hydrocarbon component in the pyrolysis feed.

8. The method of any one of embodiments 5 and 6, wherein the liquid portion is in the range of 0.1 wt % to 4 wt % of the total hydrocarbon component in the pyrolysis feed.

9. The method of embodiment 2, wherein the hydrocarbon component contains from 1 wt % to 25 wt % of a non-volatile component, based on total weight of the pyrolysis feed.

10. The method of embodiment 2, wherein the hydrocarbon component contains from 2 wt % to 16 wt % of a non-volatile component, based on total weight of the pyrolysis feed.

11. The method of any one of embodiments 9 and 10, wherein the non-combustible non-volatile component is <0.1 wt %.

12. The method of any one of embodiments 9 and 10, wherein the non-combustible non-volatile component is <0.01 wt %.

13. The method of any one of embodiments 9 to 12, wherein the hydrocarbon component of the pyrolysis feed in the liquid portion is in the range of 5 wt % to 40 wt % based on total weight of the pyrolysis feed.

14. The method of any one of embodiments 9 to 12, wherein the hydrocarbon component of the pyrolysis feed in the liquid portion may be in the range of 10 wt % to 30 wt % based on total weight of the pyrolysis feed.

15. The method of any one of embodiments 1 to 14, wherein the pyrolysis feed comprises of one or more of <10 wt % elemental oxygen and ≤10 wt % water.

16. The method of any one of embodiments 1 to 15, wherein the pyrolyzing is performed under thermal pyrolysis conditions.

17. The method of embodiment 1, further comprising the steps of:

interrupting production of the pyrolyzed hydrocarbon product;

introducing a combustion reactant to the second end of the regenerative reactor;

reacting the combustion reactant in the regenerative reactor to form combustion products;

flowing combustion products toward a first end of the regenerative reactor; and conducting away at least a portion of the non-volatile components deposited in the regenerative reactor with the combustion products at the first end of the regenerative reactor.

18. The method of any one of embodiments 1 to 17, further comprising combining molecular hydrogen with the pyrolysis feed upstream of the regenerative reactor to manage the liquid portion of the pyrolysis feed.

19. The method of any one of embodiments 1 to 18, further comprising combining molecular hydrogen with the pyrolysis feed in a first end of a regenerative reactor to vaporize at least a portion of the liquid portion of the pyrolysis feed at the first end of the regenerative reactor.

20. The method of any one of embodiments 1 to 19, wherein the pyrolysis feed is at operating conditions below the dry point upstream of the regenerative reactor.

21. The method of any one of embodiments 1 to 20, wherein the pyrolysis feed is exposed to operating conditions that are above the dry point within the regenerative reactor.

22. The method of any one of embodiments 19 to 21, wherein the ratio of molecular hydrogen to carbon ($H_2$/C) is from 0.1 to 5.0.

23. The method of any one of embodiments 1 to 22, wherein the pyrolyzing comprises exposing the vaporized hydrocarbon components to a peak pyrolysis gas temperature ≥1500° C. to produce the pyrolyzed hydrocarbon product.

24. A regenerative reactor system comprising:

a reverse flow regenerative reactor comprising:
  a housing enclosing an interior region;
  one or more process flow components configured to manage the flow of a pyrolysis stream through the interior region, wherein the one or more process flow components comprise one or more reactor beds;

a pyrolysis inlet conduit having an internal surface and in fluid communication with the reverse flow regenerative reactor, whereby the pyrolysis inlet conduit is configured to manage the flow of the pyrolysis stream to the reverse flow regenerative reactor; and a liquid distribution device disposed along the flow path of the pyrolysis stream and in fluid communication with the pyrolysis inlet conduit, whereby the liquid distribution device is configured to disperse a liquid portion of the pyrolysis stream along the internal surface of the pyrolysis inlet conduit.

25. The regenerative reactor system of embodiment 24, wherein one or more process flow components further comprising two reactor beds and one or more mixing components disposed between the reactor beds.

26. The regenerative reactor system of any one of embodiments 24 and 25, wherein the reverse flow regenerative reactor further comprises one or more structural members disposed within the internal region and near the pyrolysis inlet conduit to lessen fouling near the pyrolysis inlet conduit within the internal region.

27. The regenerative reactor system of any one of embodiments 24 to 26, further comprising a non-combustible non-volatile removal unit upstream of the pyrolysis inlet conduit and configured to remove at least a portion of non-combustible non-volatile components from the pyrolysis stream.

28. The regenerative reactor system of embodiment 27, further comprising a heat exchanger disposed between the non-combustible non-volatile removal unit and the pyrolysis inlet conduit and configured to heat the pyrolysis stream via indirect heat exchange.

29. The regenerative reactor system of embodiment 28, wherein the reverse flow regenerative reactor is a deferred combustion reactor.

30. The regenerative reactor system of embodiment 29, further comprising one or more conduits configured to pass combustion products through the heat exchanger to heat the pyrolysis stream.

31. The regenerative reactor system of embodiment 28, further comprising one or more conduits configured to pass reactor products through the heat exchanger to heat the pyrolysis stream.

32. The regenerative reactor system of any one of embodiments 24 to 31, further comprising a reactor hydrogen inlet conduit configured to pass molecular hydrogen to the interior region near the pyrolysis inlet conduit.

33. The regenerative reactor system of any one of embodiments 24 to 32, further comprising a conduit hydrogen inlet conduit configured to combine molecular hydrogen with the pyrolysis stream upstream of the reverse flow regenerative reactor.

34. The regenerative reactor system of any one of embodiments 32 and 33, further comprising:
a temperature measurement device configured to measure the temperature of the pyrolysis stream upstream of the reverse flow regenerative reactor;
a diluent control unit configured to adjust the flow rate of hydrogen provided to the pyrolysis stream; and
a process control unit in fluid communication with the temperature measurement device and the diluent control unit and having a set of instructions stored in memory and configured to:
(i) obtain data from a temperature measurement device;
(ii) calculate the amount of hydrogen diluent; and
(iii) provide an indication to the diluent control unit to adjust the flow rate of the hydrogen diluent.

The principles and modes of operation of the present techniques have been described above with reference to various exemplary and preferred embodiments. As understood by those of skill in the art, the overall present techniques, as defined by the claims, encompasses other preferred embodiments not specifically enumerated herein.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

When numerical lower limits and numerical upper limits are listed herein, ranges from any lower limit to any upper limit are contemplated.

The invention claimed is:

1. A method for pyrolyzing a pyrolysis feed in a thermal pyrolysis regenerative reactor to produce a pyrolyzed hydrocarbon product, comprising the steps of:
providing a pyrolysis feed having (i) a liquid portion and (ii) a vapor portion, the pyrolysis feed comprising a hydrocarbon component containing greater than 0.010 wt. % of a non-volatile component based on total weight of the pyrolysis feed, and wherein the liquid portion is sufficient to maintain the non-volatile component in the liquid portion;
passing the pyrolysis feed to a first end of the regenerative reactor;
vaporizing at least a portion of the liquid portion of the pyrolysis feed at the first end of the regenerative reactor;
pyrolyzing at least a portion of the hydrocarbon component under thermal pyrolysis condition to produce the pyrolyzed hydrocarbon product that comprises acetylene;
conducting away the pyrolyzed hydrocarbon product from a second end of the regenerative reactor;
removing from the regenerative reactor at least a portion of the non-volatile component via the first end of the regenerative reactor;
interrupting production of the pyrolyzed hydrocarbon product;
introducing a combustion reactant to the second end of the regenerative reactor;
reacting the combustion reactant in the regenerative reactor to form combustion products;
flowing combustion products toward the first end of the regenerative reactor; and
conducting away at least a portion of the non-volatile components deposited in the regenerative reactor with the combustion products at the first end of the regenerative reactor.

2. The method of claim 1, wherein the non-volatile component comprises a combustible non-volatile component and a non-combustible non-volatile component.

3. The method of claim 2, wherein the ratio of combustible non-volatile component to non-combustible non-volatile component is in the range of 1000:1 to 10:1, by weight.

4. The method of claim 1, wherein the pyrolysis feed contains from 0.050 wt % to 5 wt % of the non-volatile component, based on total weight of the pyrolysis feed.

5. The method of claim 4, wherein the liquid portion is in the range of 0.1 wt % to 10 wt % of the total hydrocarbon component in the pyrolysis feed.

6. The method of claim 2, wherein the pyrolysis feed contains from 1 wt % to 25 wt % of the non-volatile component, based on total weight of the pyrolysis feed.

7. The method of claim 6, wherein the pyrolysis feed comprises ≤0.1 wt % of the non-combustible non-volatile component, based on the weight of the pyrolysis feed.

8. The method of claim 6, wherein 5 wt % to 40 wt % of the hydrocarbon component of the pyrolysis feed is in the liquid portion, based on total weight of the hydrocarbon component in the pyrolysis feed.

9. The method of claim 1, further comprising combining molecular hydrogen with the pyrolysis feed upstream of the regenerative reactor in an amount sufficient to maintain the non-volatile component in the liquid portion.

10. The method of claim 1, further comprising combining molecular hydrogen with the pyrolysis feed at the first end of the regenerative reactor to vaporize at least a portion of the liquid portion of the pyrolysis feed.

11. The method of claim 1, wherein the pyrolysis feed is below its dry point upstream of the regenerative reactor.

12. The method of claim 1, wherein the pyrolysis feed is above its dry point within the regenerative reactor.

13. The method of claim 1, wherein the pyrolyzing comprises exposing the vaporized hydrocarbon components to a peak pyrolysis gas temperature $\geq 1500°$ C. to produce the pyrolyzed hydrocarbon product.

* * * * *